US012430727B2

(12) United States Patent
Zheng et al.

(10) Patent No.: US 12,430,727 B2
(45) Date of Patent: Sep. 30, 2025

(54) IMAGE AND OBJECT INPAINTING WITH DIFFUSION MODELS

(71) Applicant: ADOBE INC., San Jose, CA (US)

(72) Inventors: Haitian Zheng, Rochester, NY (US); Zhe Lin, Clyde Hill, WA (US); Jianming Zhang, Fremont, CA (US); Connelly Stuart Barnes, Seattle, WA (US); Elya Shechtman, Seattle, WA (US); Jingwan Lu, Sunnyvale, CA (US); Qing Liu, Santa Clara, CA (US); Sohrab Amirghodsi, Seattle, WA (US); Yuqian Zhou, Bellevue, WA (US); Scott Cohen, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 386 days.

(21) Appl. No.: 18/058,027

(22) Filed: Nov. 22, 2022

(65) Prior Publication Data

US 2024/0169500 A1    May 23, 2024

(51) Int. Cl.
*G06T 5/77*    (2024.01)
*G06T 5/73*    (2024.01)

(52) U.S. Cl.
CPC .................. *G06T 5/77* (2024.01); *G06T 5/73* (2024.01); *G06T 2207/20081* (2013.01); *G06T 2207/20104* (2013.01)

(58) Field of Classification Search
CPC ... G06T 5/77; G06T 5/73; G06T 2207/20081; G06T 2207/20104; G06T 2207/20084;
(Continued)

(56) References Cited

U.S. PATENT DOCUMENTS 11,798,132 B2 * 10/2023 Wang ........................ G06N 7/01
2022/0156896 A1 * 5/2022 Li ............................. G06T 5/77
(Continued)

FOREIGN PATENT DOCUMENTS

WO    WO2022108373 A1    5/2022

OTHER PUBLICATIONS

Combined Search and Examination Report dated Mar. 6, 2024 in corresponding United Kingdom Patent Application No. 2314582.4 (5 pages).
(Continued)

*Primary Examiner* — Jennifer Mehmood
*Assistant Examiner* — Pardis Sohraby
(74) *Attorney, Agent, or Firm* — F. CHAU & ASSOCIATES, LLC

(57) ABSTRACT

Systems and methods for image processing are described. Embodiments of the present disclosure receive an image comprising a first region that includes content and a second region to be inpainted. Noise is then added to the image to obtain a noisy image, and a plurality of intermediate output images are generated based on the noisy image using a diffusion model trained using a perceptual loss. The intermediate output images predict a final output image based on a corresponding intermediate noise level of the diffusion model. The diffusion model then generates the final output image based on the intermediate output image. The final output image includes inpainted content in the second region that is consistent with the content in the first region.

18 Claims, 15 Drawing Sheets

(58) Field of Classification Search
CPC ......... G06T 5/60; G06T 11/60; G06N 3/0464; G06N 3/08
USPC ........................................................ 382/100
See application file for complete search history.

(56) References Cited

U.S. PATENT DOCUMENTS

| | | | |
|---|---|---|---|
| 2023/0067841 A1* | 3/2023 | Saharia | G06N 3/047 |
| 2023/0245285 A1* | 8/2023 | Dinh | G06V 10/60 |
| | | | 382/274 |
| 2023/0377214 A1* | 11/2023 | Kansy | G06V 10/82 |
| 2024/0135630 A1* | 4/2024 | Nagano | G06T 5/70 |

OTHER PUBLICATIONS

1Ho, et al., "Denoising Diffusion Probabilistic Models", Advances in Neural Information Processing Systems, 33, pp. 6840-6851, arXiv preprint arXiv:2006.11239v2 [cs.LG] Dec. 16, 2020.
2Nichol, et al., "Improved Denoising Diffusion Probabilistic Models", In International Conference on Machine Learning (pp. 8162-8171), PMLR, arXiv preprint arXiv:2102.09672v1 [cs.LG] Feb. 18, 2021.
3Saharia, et al., "Palette: Image-to-Image Diffusion Models", In ACM SIGGRAPH 2022 Conference Proceedings (pp. 1-10), arXiv preprint arXiv:2111.05826v2 [cs.CV] May 3, 2022.
4Suvorov, et al., "Resolution-robust Large Mask Inpainting with Fourier Convolutions", In Proceedings of the IEEE/CVF Winter Conference on Applications of Computer Vision, (2022), (pp. 2149-2159).
5Song, et al., "Denoising Diffusion Implicit Models", arXiv preprint arXiv:2010.02502v4 [cs.LG] Oct. 5, 2022, 22 pages.
6Yu, et al., "Generative Image Inpainting with Contextual Attention", In Proceedings of the IEEE conference on computer vision and pattern recognition, (2018), (pp. 5505-5514).
Yu, et al., "Free-Form Image Inpainting with Gated Convolution", In Proceedings of the IEEE/CVF international conference on computer vision (pp. 4471-4480); arXiv preprint arXiv:1806.03589v2 [cs.CV] Oct. 22, 2019.
8Zhao, et al., "Large Scale Image Completion via Co-Modulated Generative Adversarial Networks", arXiv preprint arXiv:2103.10428v1 [cs.CV] Mar. 18, 2021, 25 pages.
9Zheng, et al., "Image Inpainting with Cascaded Modulation GAN and Object-Aware Training", arXiv preprint arXiv:2203.11947v3 [cs.CV] Jul. 21, 2022, 32 pages.
10Zeng, et al., "High-Resolution Image Inpainting with Iterative Confidence Feedback and Guided Upsampling", In European conference on computer vision (pp. 1-17), Springer, Cham, arXiv preprint arXiv:2005.11742v2 [cs.CV] Jul. 14, 2020.
11Benny, et al., "Dynamic Dual-Output Diffusion Models", In Proceedings of the IEEE/CVF Conference on Computer Vision and Pattern Recognition (pp. 11482-11491); arXiv preprint arXiv:2203.04304v2 [cs.CV] Mar. 15, 2022.
12Choi, et al., "Perception Prioritized Training of Diffusion Models", In Proceedings of the IEEE/CVF Conference on Computer Vision and Pattern Recognition, (2022), (pp. 11472-11481).
13Xiao, et al., "Tackling the Generative Learning Trilemma With Denoising Diffusion GANS", arXiv preprint arXiv:2112.07804v2 [cs.LG] Apr. 4, 2022, 28 pages.
14Rombach, et al., "High-Resolution Image Synthesis with Latent Diffusion Models", In Proceedings of the IEEE/CVF Conference on Computer Vision and Pattern Recognition (pp. 10684-10695), arXiv preprint arXiv:2112.10752v2 [cs.CV] Apr. 13, 2022.
15Lugmayr, et al., "RePaint: Inpainting using Denoising Diffusion Probabilistic Models", In Proceedings of the IEEE/CVF Conference on Computer Vision and Pattern Recognition (pp. 11461-11471), arXiv preprint arXiv:2201.09865v4 [cs.CV] Aug. 31, 2022.

* cited by examiner

IMAGE AND OBJECT INPAINTING WITH DIFFUSION MODELS

BACKGROUND

The following relates generally to digital image processing using machine learning. Digital image processing refers to the use of a computer to edit a digital image using an algorithm or a processing network. In some cases, image processing software may be used for various image processing tasks, such as image editing, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) may include using a machine learning model to generate images. Diffusion-based image generation models are examples of machine learning models used to generate images. Diffusion models are one class of generative neural networks which can be trained to generate new data with features similar to features found in training data.

SUMMARY

The present disclosure describes systems and methods for image processing. Embodiments of the disclosure include an image processing apparatus configured to receive an image that includes a masked area and generate an output image that includes inpainted content. The inpainted content is consistent with context of the image. The image processing apparatus includes a diffusion model trained using a perceptual loss, and using $x_0$ reparameterization instead of epsilon reparameterization (or $\in_\theta$). That is, the diffusion model is trained to predict a clean output image ($x_0$) rather than noise $\in$ at a timestep. In some examples, the training process uses a sample-based perceptual loss and an adaptively-blurred perceptual loss. This way, the final output image has increased image quality and less artifacts.

A method, apparatus, and non-transitory computer readable medium for image processing are described. One or more embodiments of the method, apparatus, and non-transitory computer readable medium include receiving an image comprising a first region that includes content and a second region to be inpainted; adding noise to the image to obtain a noisy image; generating a plurality of intermediate output images based on the noisy image using a diffusion model, wherein the diffusion model is trained using a perceptual loss, and wherein each of the plurality of intermediate output images comprises an intermediate prediction of a final output image based on a corresponding intermediate noise level of the diffusion model; and generating the final output image based on the intermediate output image using the diffusion model, wherein the final output image includes inpainted content in the second region that is consistent with the content in the first region.

A method, apparatus, and non-transitory computer readable medium for image processing are described. One or more embodiments of the method, apparatus, and non-transitory computer readable medium include receiving an image comprising content in a first region and in a second region; masking the second region to obtain a masked image; adding noise to the masked image to obtain a noisy image; generating a predicted output image based on the noisy image using a diffusion model; comparing the predicted output image to the image to obtain a perceptual loss; and training the diffusion model by updating parameters of the diffusion model based on the perceptual loss.

An apparatus and method for image processing are described. One or more embodiments of the apparatus and method include a processor; and a memory including instructions executable by the processor to: receive an image comprising a first region that includes content and a second region to be inpainted; add noise to the image to obtain a noisy image; generate a plurality of intermediate output images based on the noisy image using a diffusion model, wherein the diffusion model is trained using a perceptual loss, and wherein each of the plurality of intermediate output images comprises an intermediate prediction of a final output image based on a corresponding intermediate noise level of the diffusion model; and generate the final output image based on the intermediate output image using the diffusion model, wherein the final output image includes inpainted content in the second region that is consistent with the content in the first region.

DETAILED DESCRIPTION

Figure 1:
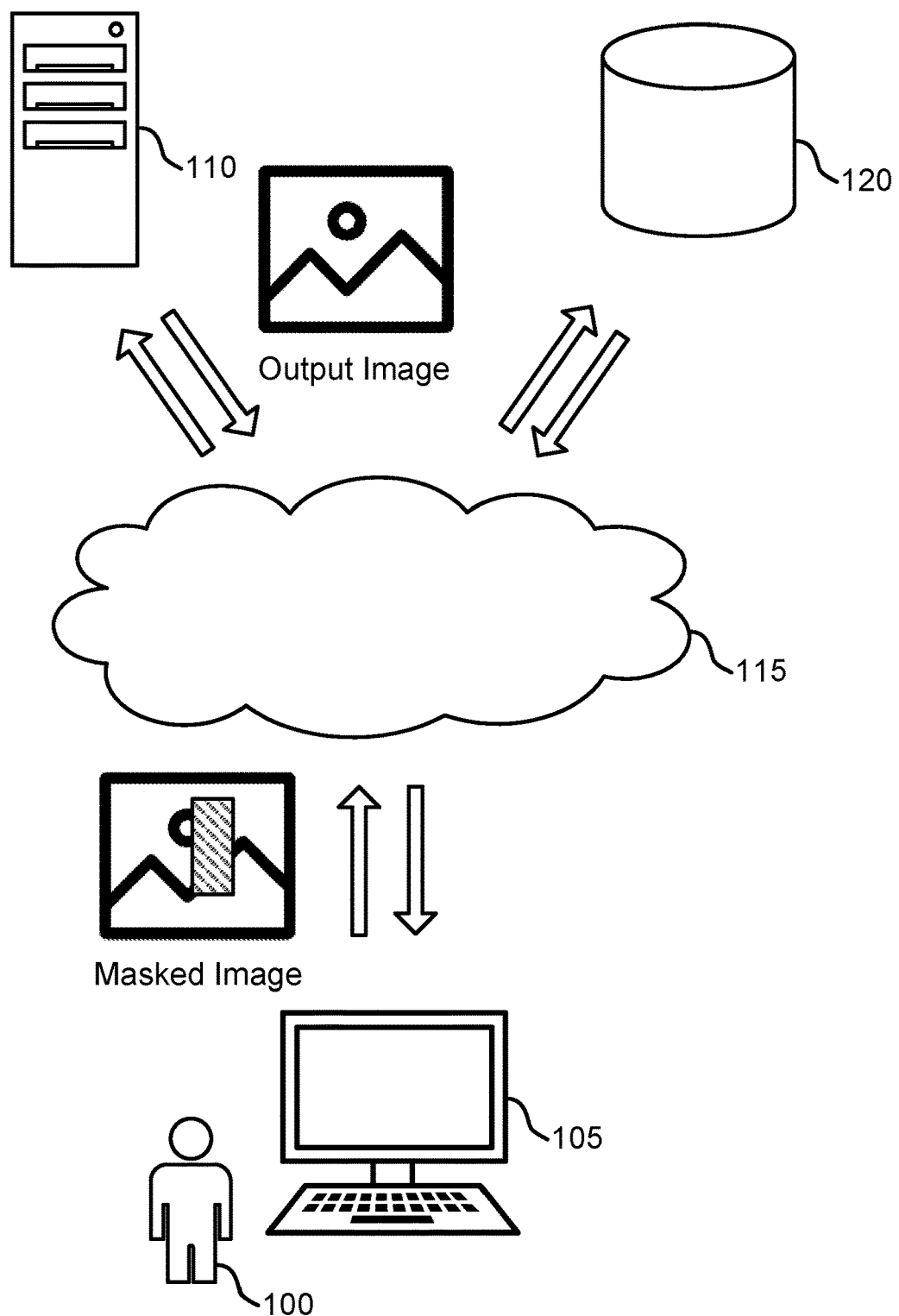
FIG. 1 shows an example of an image processing system according to aspects of the present disclosure.

The present disclosure describes systems and methods for image processing. Embodiments of the disclosure include an image processing apparatus configured to receive an image that includes a masked area and generate an output image includes inpainted content. The inpainted content is consistent with context and rest of the image. The image processing apparatus includes a diffusion model trained using a perceptual loss, and using $x_0$ reparameterization instead of epsilon reparameterization (or $\epsilon_\theta$). That is, the diffusion model is trained to predict a clean output image ($x_0$) rather than noise. In particular, the training process uses a sample-based perceptual loss and an adaptively-blurred perceptual loss. This way, the final output image has increased image quality and less artifacts.

Diffusion models are a class of generative neural networks which can be trained to generate new data with features similar to features found in training data. Diffusion models can be used in image completion tasks, such as image inpainting. In some examples, however, diffusion models may generate poor results when taking masked images as condition for inpainting. For instance, diffusion models may generate unwanted artifacts like blurry outputs (especially in the first few iterations during the reverse process), leading to unrealistic results. Additionally, diffusion models trained using conventional techniques converge slowly. Thus, the value and quality of the images produced by diffusion models may be limited by the unwanted artifacts appeared in the generated images.

Embodiments of the present disclosure include an image processing apparatus configured to receive a masked image having a masked region and generate an output image that completes the masked region with content that is consistent with context of rest of the masked image. The image processing apparatus includes a diffusion model trained using $x_0$ reparameterization instead of epsilon reparameterization (or $\epsilon_\theta$).

In some examples, a diffusion model takes a noisy image ($x_t$) and predicts the noise corresponding to the noisy image. During reverse diffusion, the diffusion model denoises the noisy image at each step and generates a less noisy image ($x_{t-1}$). Instead of predicting the random noise, embodiments of the present disclosure predict an estimated clean image or $x_0$ and then add noise back to the estimated clean image to obtain a noisy output image. Then the diffusion model generates $x_{t-1}$ based on the noisy output image. At the next iteration, the diffusion model takes noisy image $x_{t-1}$ as input, predicts a new estimated clean image, and repeats the same operation for the subsequent iterations. The new estimated clean image is better than the estimated clean image previously generated (e.g., the new estimated clean image has higher image quality and is less blurry). Accordingly, at each denoising step, the diffusion model is configured to predict an estimated clean image and adds noise back to the estimated clean image. This way, quality of predicted images is improved.

In some embodiments, the diffusion model is trained using a sample-based perceptual loss. The diffusion model takes a noisy image as input and predicts an estimated clean image $x_0$. The diffusion model adds the noise back to the predicted clean image $x_0$. In some examples, the training component samples Gaussian noise and adds the sampled noise back to the predicted image to obtain a set of K sampled noisy images. The training component generates features corresponding to the set of K sampled noisy images and averages these features. Additionally, the training component takes a ground-truth image corresponding to the noisy image and generates a set of K intermediate noisy images based on the ground-truth image. The training component generates features corresponding to the set of K intermediate noisy images and averages these features. The training component computes the sample-based perceptual loss based on the sampled noisy images and the intermediate noisy images.

In some embodiments, the diffusion model is trained using an adaptively-blurred perceptual loss by applying a Gaussian kernel of different sizes to the predicted images and ground-truth images. For example, a large kernel size and a small kernel size are used in combination to improve output image quality. The adaptively-blurred perceptual loss focuses on low-frequency content such as background information, color, etc., at initial timesteps.

Embodiments of the present disclosure may be used in the context of image generation applications. For example, an image processing network based on the present disclosure takes a masked image and efficiently generates an output image that completes the missing region of the masked image. An example application, according to some embodiments, is provided with reference to FIG. 6. Details regarding the architecture of an example image processing apparatus are provided with reference to FIGS. 1-5. Example processes for image processing are provided with reference to FIGS. 6-9. Example training processes are described with reference to FIGS. 10-14.

Accordingly, embodiments of the present disclosure increase the quality of generated images and remove unnecessary artifacts. Additionally, embodiments speed up the training process for the diffusion model, as well as the image generation process, because the model is trained to predict a clean output image ($x_0$) rather than random noise. Furthermore, by training the model using a perceptual loss, embodiments of the present disclosure can generate images that more accurately depict structural patterns and textures compared to traditional image generation systems.

Network Architecture

In FIGS. 1-5, an apparatus and method for image processing is described. One or more embodiments of the apparatus include a processor and a memory including instructions executable by the processor to receiving an image comprising a first region that includes content and a second region to be inpainted; adding noise to the image to obtain a noisy image; generating a plurality of intermediate output images based on the noisy image using a diffusion model, wherein the diffusion model is trained using a perceptual loss, and wherein each of the plurality of intermediate output images comprises an intermediate prediction of a final output image based on a corresponding intermediate noise level of the diffusion model; and generating the final output image based on the intermediate output image using the diffusion model, wherein the final output image includes inpainted content in the second region that is consistent with the content in the first region.

In some embodiments, the diffusion model comprises a U-Net architecture. The diffusion model comprises a denoising diffusion probabilistic model (DDPM). The perceptual loss comprises a sample-based perceptual loss and an adaptively-blurred perceptual loss. Some examples of the apparatus and method further include a user interface configured to receive a user input indicating the second region to be inpainted.

FIG. 1 shows an example of an image processing system according to embodiments of the present disclosure. The example shown includes user 100, user device 105, image processing apparatus 110, cloud 115, and database 120.

Image processing apparatus 110 is an example of, or includes aspects of, the corresponding element described with reference to FIG. 2.

As an example shown in FIG. 1, user 100 provides a masked image. Image processing apparatus 110 receives the masked image via e.g., user device 105 and cloud 115. The masked image includes a masked region or a missing region to be filled in. Image processing apparatus 110 generates a noisy image by adding random noise to the masked image. Image processing apparatus 110 generates an output image from the noisy image.

Image processing apparatus 110 inpaints the missing region and generates high quality output image that is semantically realistic. In some examples, the region to be inpainted includes diverse and complex objects. In some examples, the output image includes an inpainted region that is consistent with context of the rest of masked image. Image processing apparatus 110 returns the output image to user 100 via cloud 115 and user device 105. The process of using image processing apparatus 110 is further described with reference to FIG. 6.

The user device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). The image editing application may either include or communicate with image processing apparatus 110. In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 includes a computer implemented network. Image processing apparatus 110 may also include a processor unit, a memory unit, an I/O module, and a training component. The training component is used to train a machine learning model (e.g., a diffusion model). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 2-5. Further detail regarding the operation of image processing apparatus 110 is provided with reference to FIGS. 6-9.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
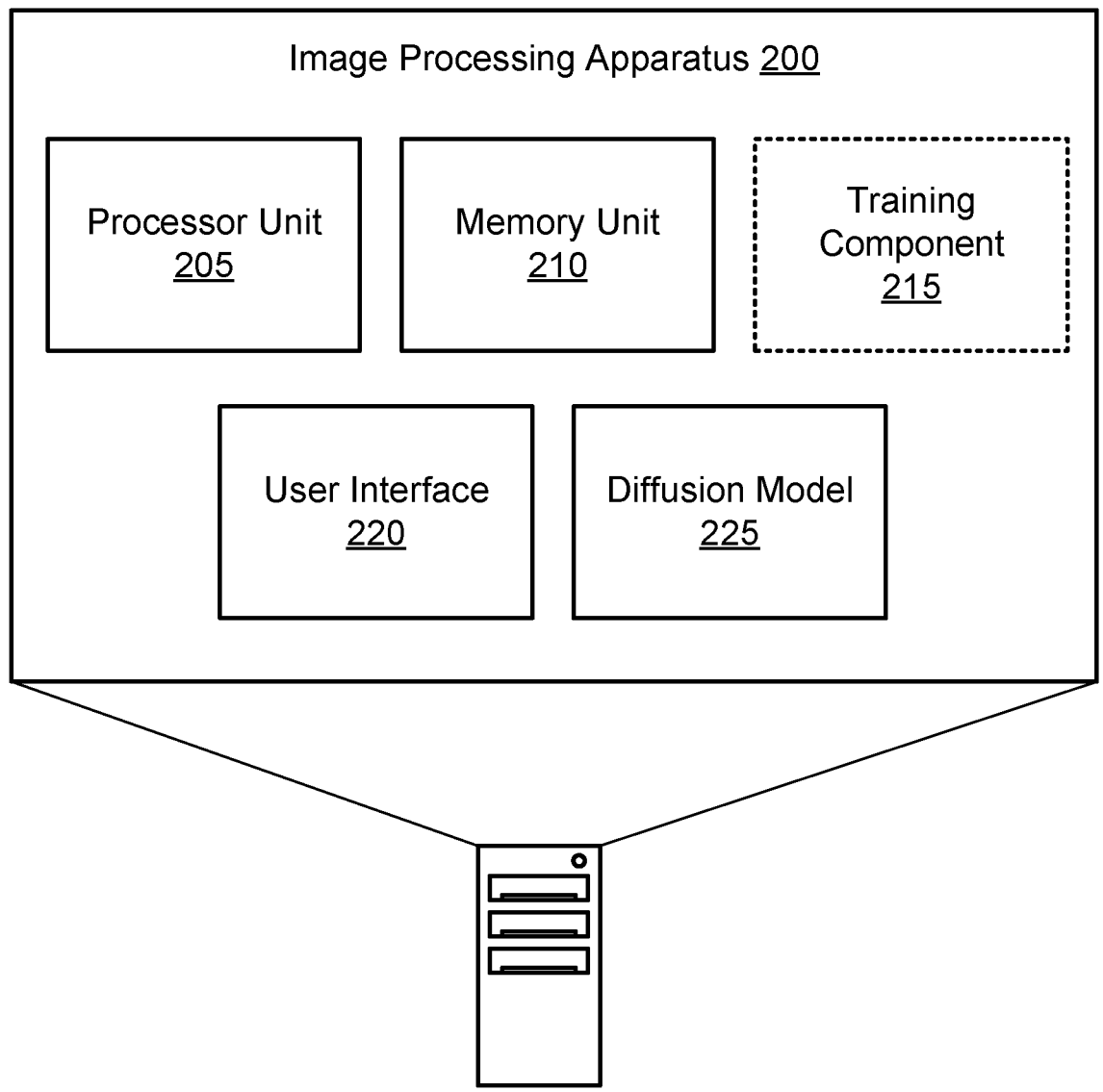
FIG. 2 shows an example of an image processing apparatus according to aspects of the present disclosure.

FIG. 2 shows an example of an image processing apparatus 200 according to embodiments of the present disclosure. The example shown includes image processing apparatus 200, processor unit 205, memory unit 210, training component 215, user interface 220, and diffusion model 225. Image processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing. According to some embodiments, processor unit 205 is configured to perform operations of diffusion model 225.

Memory unit 210 includes instructions executable by processor unit 205. Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory unit 210 includes parameters of diffusion model 225.

According to some embodiments of the present disclosure, image processing apparatus 200 includes a computer implemented artificial neural network (ANN) for image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to increase the accuracy of the result (i.e., by attempting to minimize a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image processing apparatus 200 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 215 compares the predicted output image to the image to obtain a perceptual loss. Training component 215 trains diffusion model 225 by updating parameters of diffusion model 225 based on the perceptual loss. In some examples, training component 215 computes a reconstruction loss based on the predicted noise and a ground truth noise, where the parameters of diffusion model 225 are updated based on the reconstruction loss. In some examples, training component 215 computes a weighted signal-to-noise-ratio loss, where the weighted signal-to-noise-ratio loss includes the reconstruction loss.

According to some embodiments, the perceptual loss includes a sample-based perceptual loss and an adaptively-blurred perceptual loss. In some examples, training component 215 computes a sample-based perceptual loss, where the perceptual loss includes the sample-based perceptual loss. In some examples, training component 215 compares the image features and the intermediate image features to obtain the sample-based perceptual loss, where the parameters of diffusion model 225 are updated based on the sample-based perceptual loss. In some examples, training component 215 identifies a set of intermediate noisy images including the intermediate noisy image between the image and the noisy image, where the sample-based perceptual loss is computed based on the set of intermediate noisy images. In some examples, training component 215 selects a set of samples of the predicted output image, where the sample-based perceptual loss is computed based on the set of samples of the predicted output image.

In some examples, training component 215 computes an adaptively-blurred perceptual loss, where the perceptual loss includes the adaptively-blurred perceptual loss. In some examples, training component 215 identifies a filter of a predetermined kernel size, where the adaptively-blurred perceptual loss is computed based on the filter. In some examples, training component 215 identifies a first kernel at a first step. Training component 215 identifies a second kernel at a second step, where a size of the second kernel is different from a size of the first kernel, and where the adaptively-blurred perceptual loss is computed based on the first kernel and the second kernel. In some examples, training component 215 is part of another apparatus other than image processing apparatus 200.

According to some embodiments, user interface 220 receives an image including a first region that includes content and a second region to be inpainted. In some examples, user interface 220 provides the image as an input to diffusion model 225, where the intermediate output image is conditioned based on the first region of the image. In some examples, user interface 220 receives a user input indicating the second region to be inpainted.

According to some embodiments, user interface 220 receives an image including content in a first region and in a second region. For example, user interface 220 receives an image including a second region to be inpainted. In some examples, user interface 220 is configured to receive a user input indicating the second region to be inpainted.

According to some embodiments, diffusion model 225 adds noise to the image to obtain a noisy image. Diffusion model 225 generates a set of intermediate output images based on the noisy image, where diffusion model 225 is trained using a perceptual loss, and where each of the set of intermediate output images includes an intermediate prediction of a final output image based on a corresponding intermediate noise level of diffusion model 225. Diffusion model 225 generates the final output image based on the intermediate output image, where the final output image includes inpainted content in the second region that is consistent with the content in the first region. In some examples, diffusion model 225 encodes the noisy image to obtain image features. Diffusion model 225 decodes the image features to obtain the intermediate output image.

According to some embodiments, diffusion model 225 masks the second region to obtain a masked image. Diffusion model 225 adds noise to the masked image to obtain a noisy image. Diffusion model 225 generates a predicted output image based on the noisy image. In some examples, diffusion model 225 computes a predicted noise based on the noisy image. In some examples, diffusion model 225 adds intermediate noise to the predicted output image to obtain a noisy output image. Diffusion model 225 encodes the noisy output image to obtain image features. Diffusion model 225 identifies an intermediate noisy image between the image and the noisy image. Diffusion model 225 encodes the intermediate noisy image to obtain intermediate image features.

According to some embodiments, diffusion model 225 adds noise to the image to obtain a noisy image. In some examples, diffusion model 225 is trained using a perceptual loss, and wherein each of the plurality of intermediate output images comprises an intermediate prediction of a final output image based on a corresponding intermediate noise level of diffusion model 225. In some examples, diffusion model 225 generates the final output image based on the intermediate output image, where the final output image includes inpainted content in the second region that is consistent with the content in the first region. According to some embodiments, diffusion model 225 includes one or more ANNs. In some examples, diffusion model 225 includes a pixel diffusion model. In some embodiments, diffusion model 225 includes a U-Net architecture. In some embodiments, diffusion model 225 includes a denoising diffusion probabilistic model (DDPM). Diffusion model 225 is an example of, or includes aspects of, the corresponding element described with reference to FIG. 3.

According to some embodiments, DDPM are a class of diffusion models which refer to a parameterized Markov chain that gradually adds noise to the input image in the opposite direction of sampling to obtain a noisy image. In some cases, DDPM is trained to gradually denoise data and estimate parameters of the generation process. In some cases, DDPM generates an output image based on training using variational inference to produce samples matching a input image after finite time. In some examples, the output image depicts a semantically realistic region based on a masked or missing region of the input image.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
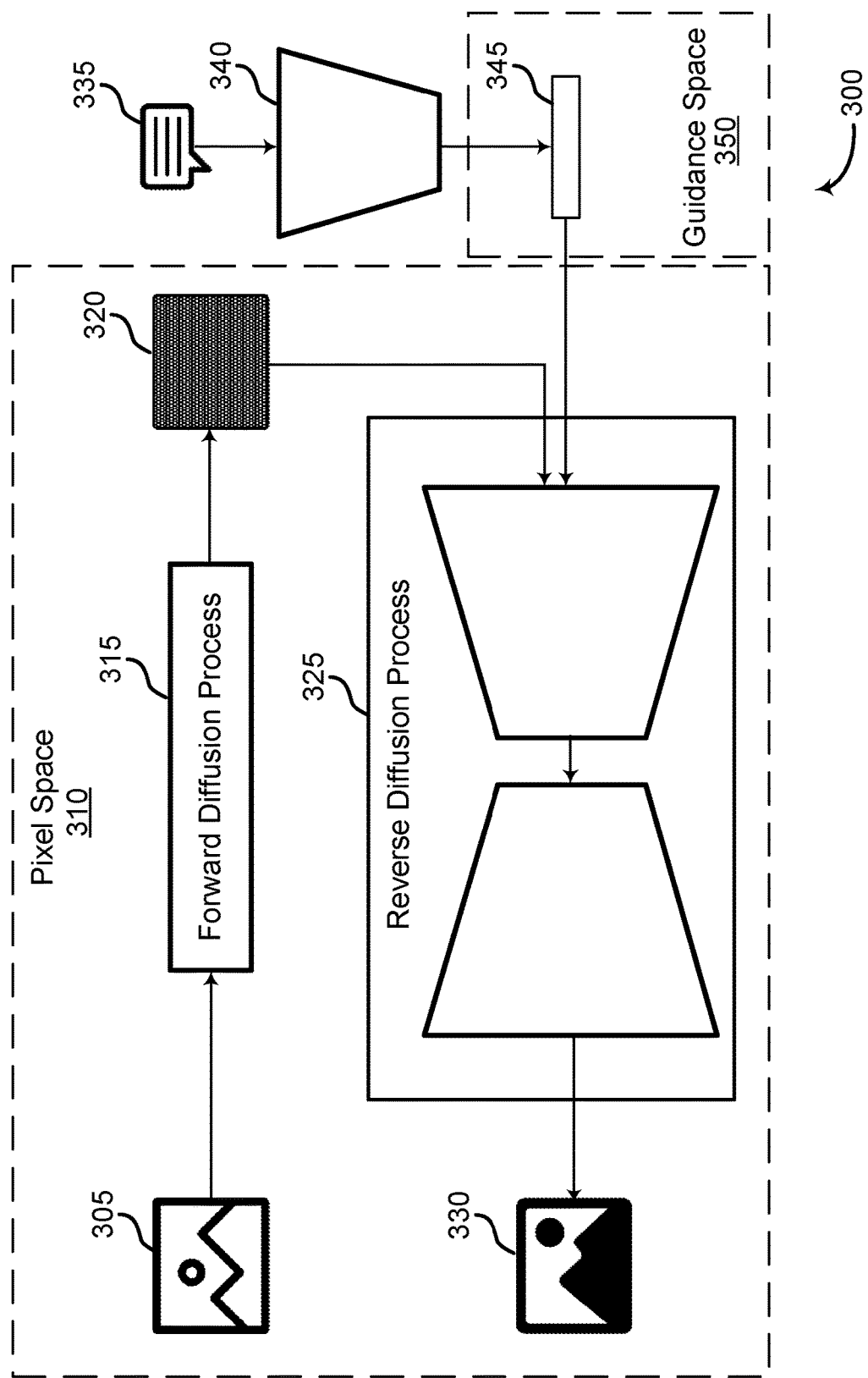
FIG. 3 shows an example of a pixel diffusion model according to aspects of the present disclosure.

FIG. 3 shows an example of a pixel diffusion model 300 according to embodiments of the present disclosure. The example shown includes pixel diffusion model 300, image 305, pixel space 310, forward diffusion process 315, noisy image 320, reverse diffusion process 325, final output image 330, text prompt 335, text encoder 340, guidance features 345, and guidance space 350. The guided latent diffusion model 300 depicted in FIG. 3 is an example of, or includes aspects of, the corresponding element described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, pixel diffusion model 300 may take an original image 305 in a pixel space 310 as input and apply forward diffusion process 330 to gradually add noise to the original image 305 to obtain noisy images 320 at various noise levels.

Next, a reverse diffusion process 325 (e.g., a U-Net ANN) gradually removes the noise from the noisy images 320 at the various noise levels to obtain an output image 330. In some cases, an output image 330 is created from each of the various noise levels. The output image 330 can be compared to the original image 305 to train the reverse diffusion process 325.

The reverse diffusion process 325 can also be guided based on a text prompt 335, or another guidance prompt, such as an image, a layout, a segmentation map, etc. The text prompt 335 can be encoded using a text encoder 365 (e.g., a multimodal encoder) to obtain guidance features 345 in guidance space 350. The guidance features 345 can be combined with the noisy images 320 at one or more layers of the reverse diffusion process 325 to ensure that the output image 330 includes content described by the text prompt 335. For example, guidance features 345 can be combined with the noisy features using a cross-attention block within the reverse diffusion process 325.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

According to an embodiment of the present disclosure, image 305 is an example of, or includes embodiments of, the corresponding element described with reference to FIGS. 7 and 13. Noisy image 320 is an example of, or includes aspects of, the corresponding element described with reference to FIGS. 5 and 13. Reverse diffusion process 325 is an example of, or includes aspects of, the corresponding element described with reference to FIG. 13.

Figure 4:
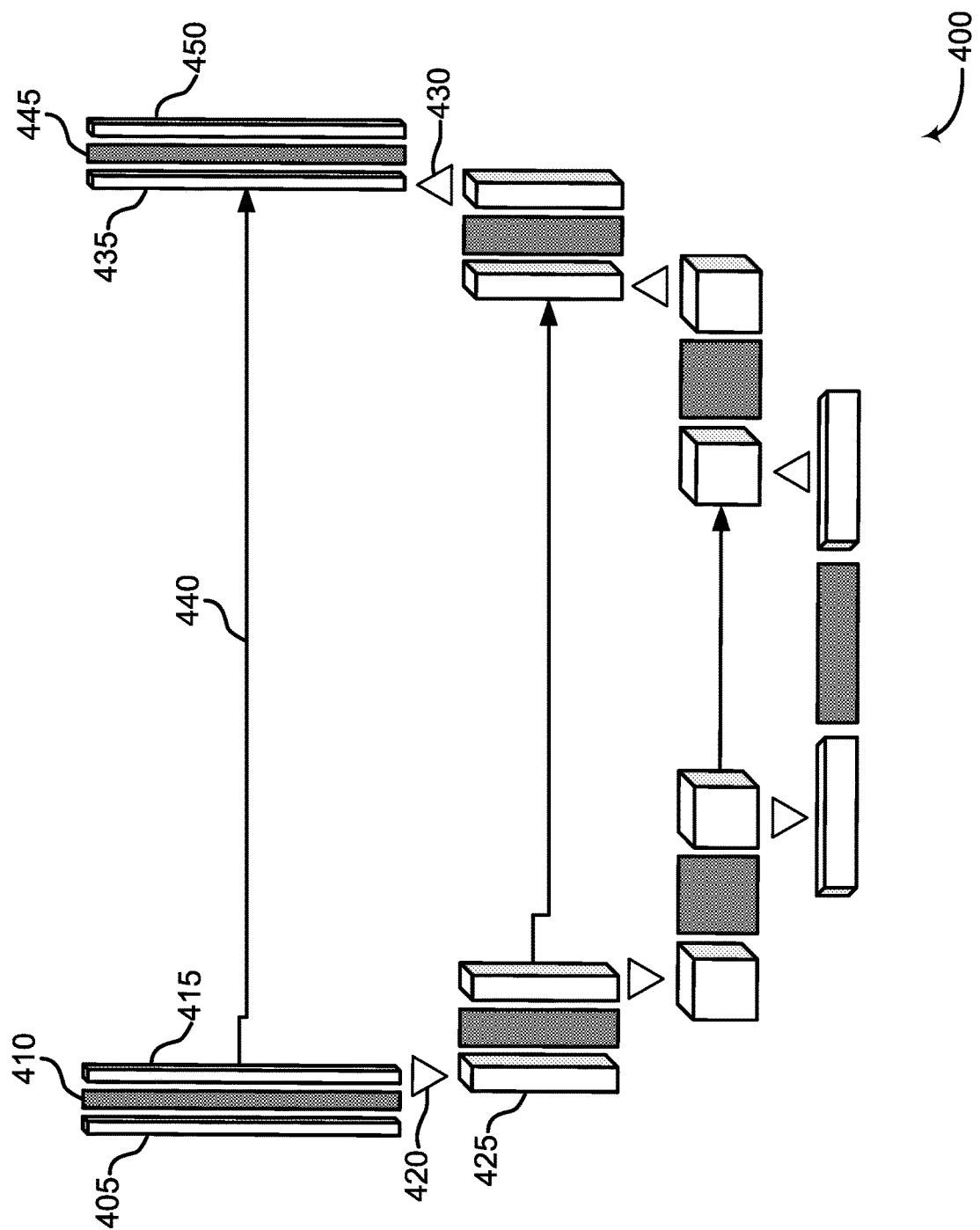
FIG. 4 shows an example of U-net architecture according to aspects of the present disclosure.

FIG. 4 shows an example of U-net architecture according to embodiments of the present disclosure. The example shown includes U-Net 400, input features 405, initial neural network layer 410, intermediate features 415, down-sampling layer 420, down-sampled features 425, up-sampling layer 430, up-sampled features 435, skip connection 440, final neural network layer 445, and output features 450. The U-Net 400 depicted in FIG. 4 is an example of, or includes aspects of, the architecture used within the reverse diffusion process described with reference to FIG. 3.

In some examples, diffusion models are based on a neural network architecture known as a U-Net. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. That is, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Figure 5:
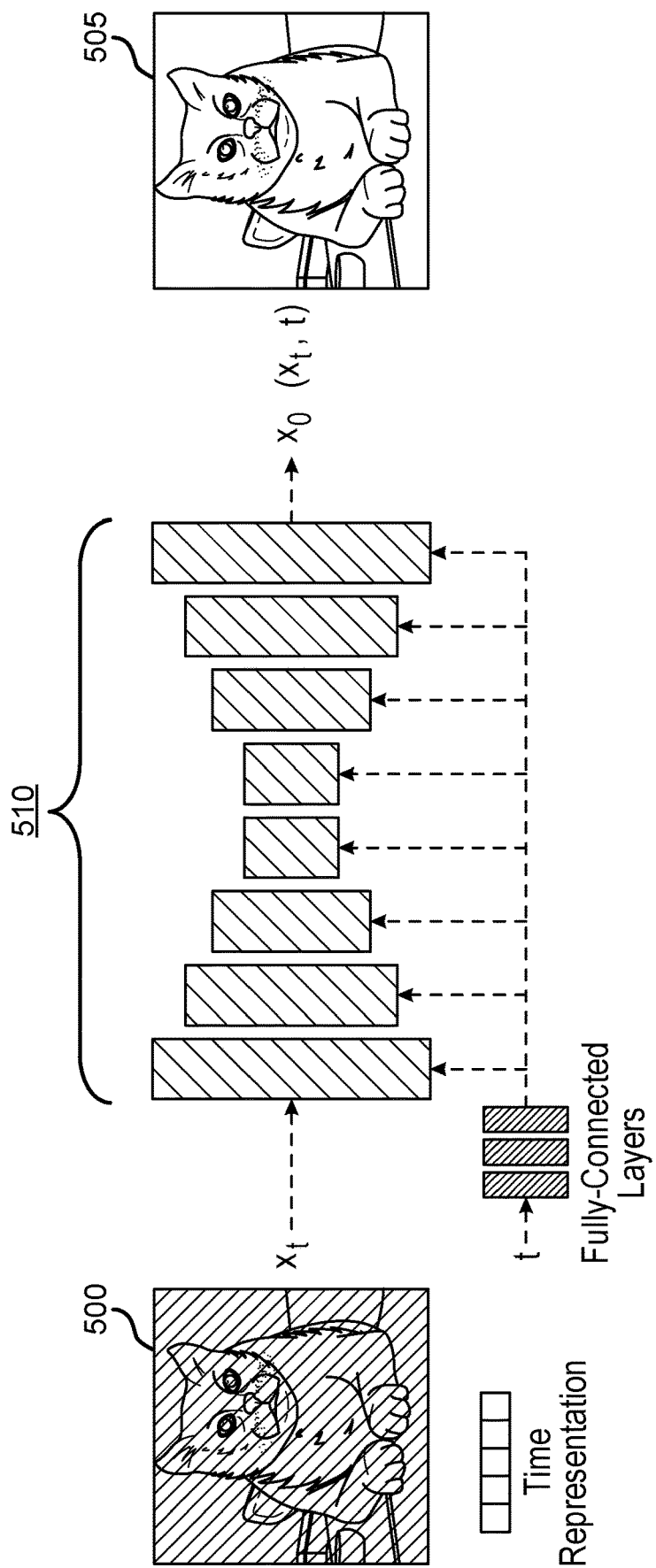
FIG. 5 shows an example of x0 reparameterization using a diffusion model according to aspects of the present disclosure.

FIG. 5 shows an example of x0 reparameterization using a diffusion model according to embodiments of the present disclosure. The example shown includes noisy image 500, output image 505, and reverse diffusion process 510. In some cases, a diffusion model can include both a forward diffusion process for adding noise to an image (or features in a latent space) and a reverse diffusion process for denoising the images (or features) to obtain a denoised image. In some cases, the forward diffusion process is used during training to generate images with successively greater noise, and a neural network is trained to perform the reverse diffusion process (i.e., to successively remove the noise).

According to an embodiment of the present disclosure, pixel diffusion model 300, as described in FIG. 3, takes an original image in a pixel space as input and gradually adds noise to the original image to obtain noisy image 500 via forward diffusion process. In some examples, pixel diffusion model 300 generates a set of noisy images at various noise levels. In some cases, pixel diffusion model iterates through the Markov chain to obtain the desired noisy image. Noisy image 500 is an example of, or includes aspects of, the corresponding element described with reference to FIGS. 3 and 13.

As an example shown in FIG. 5, reverse diffusion process 510 (e.g., a U-Net ANN), as described in FIG. 3, gradually removes the noise from the noisy images at the various noise levels to obtain output image 505. In some cases, output image 505 is created from each of the various noise levels at a timestep. Output image 505 is an example of, or includes aspects of, the corresponding element described with reference to FIGS. 7 and 13.

According to an embodiment, an image inpainting model predicts inpainted content and fills in a missing region of an image. The image inpainting model includes a diffusion model for image completion. For example, the U-net structure of the DDPM is used to implement a denoiser. In some cases, approximation is used to generate noise at a timestep, i.e., epsilon ($\in$)-reparameterization is performed. Here, lower case epsilon is used. In some cases, the ∈-reparameterization refers to using a U-net model to predict noise added to a noisy image at a timestep t. For example, the U-net model takes the noisy image $x_t$ and timestep t as input to predict the noise added to the noisy image $x_t$ at timestep t.

As an example shown in FIG. 5, diffusion model 300, as described with reference to FIG. 3, uses a vector representing timestep t as an input. The convolution layers of the U-net architecture of the diffusion model combine the time representation t with image features obtained from noisy image 500 to generate an output image 505. For example, such a combination may be performed using methods as concatenation, attention layers, dot products, etc.

Embodiments of the present disclosure include a diffusion model that takes a noisy image as input and uses the neural network to predict a clean image. In some cases, diffusion model 300 uses approximation to generate a clean image at a timestep. For example, the U-net model predicts a clean image $x_0(x_t, t)$ at a timestep t, instead of noise E. Further, noise is added again to the predicted clean image $x_0(x_t, t)$. In this case, noise has a lower intensity than the noise added at the previous time step and the network generates $x_{t-1}$. Accordingly, an x0-reparameterization is performed. In some cases, an x0 reparameterization is implemented to increase training performance of diffusion model 300.

Image Completion

In FIGS. 6-9, a method, apparatus, and non-transitory computer readable medium for image processing are described. One or more embodiments of the method, apparatus, and non-transitory computer readable medium include receiving an image comprising a first region that includes content and a second region to be inpainted; adding noise to the image to obtain a noisy image; generating a plurality of intermediate output images based on the noisy image using a diffusion model, wherein the diffusion model is trained using a perceptual loss, and wherein each of the plurality of intermediate output images comprises an intermediate prediction of a final output image based on a corresponding intermediate noise level of the diffusion model; and generating the final output image based on the intermediate output image using the diffusion model, wherein the final output image includes inpainted content in the second region that is consistent with the content in the first region.

Some examples of the method, apparatus, and non-transitory computer readable medium further include providing the image as an input to the diffusion model, wherein the intermediate output image is conditioned based on the first region of the image.

Some examples of the method, apparatus, and non-transitory computer readable medium further include encoding the noisy image to obtain image features. Some examples further include decoding the image features to obtain the intermediate output image. Some examples of the method, apparatus, and non-transitory computer readable medium further include receiving a user input indicating the second region to be inpainted.

Figure 6:
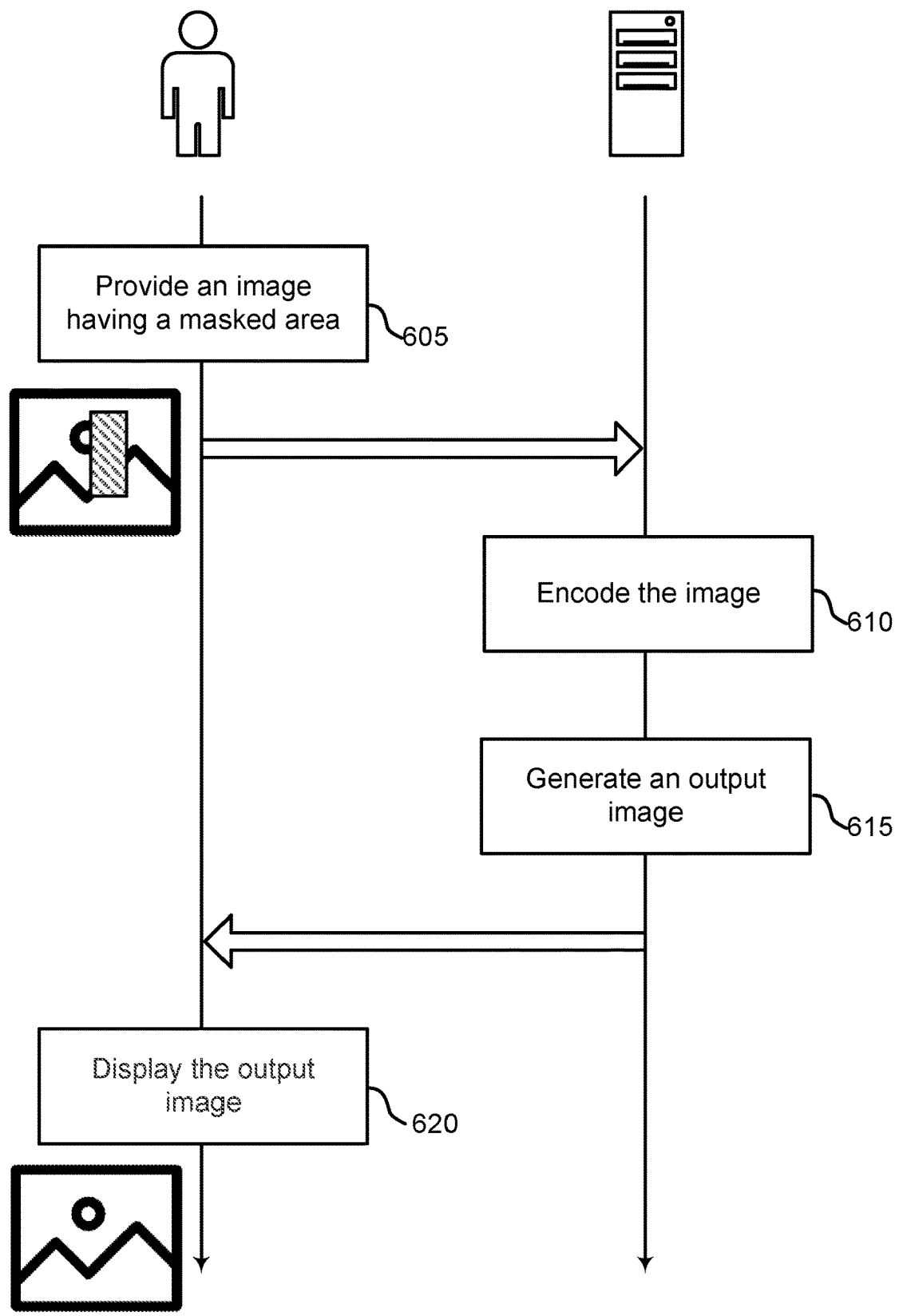
FIG. 6 shows an example of image inpainting process according to aspects of the present disclosure.

FIG. 6 shows an example of image inpainting process according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the user provides an image having a masked area. In some cases, the operations of this step refer to, or may be performed by, a user as described with reference to FIG. 1. As an example shown in FIG. 6, the image includes a masked region or missing content. In some cases, the user uploads the image using a user interface.

At operation 610, the system encodes the image. In some cases, the operations of this step refer to, or may be performed by, an image processing apparatus as described with reference to FIGS. 1 and 2. Detail regarding the encoding process is described with reference to FIG. 3.

At operation 615, the system generates an output image based on the encoding. In some cases, the operations of this step refer to, or may be performed by, an image processing apparatus as described with reference to FIGS. 1 and 2. In some examples, the image processing apparatus generates the output image using a diffusion model (e.g., pixel diffusion model 300). The diffusion model predicts and fills in the masked area of the image.

At operation 620, the system displays the output image to the user. In some cases, the operations of this step refer to, or may be performed by, a user as described with reference to FIG. 1. In some cases, the image processing apparatus displays the output image to the user via the user interface. For example, the output image includes inpainted content in the masked area that is consistent with the rest of the content of the image.

Figure 7:
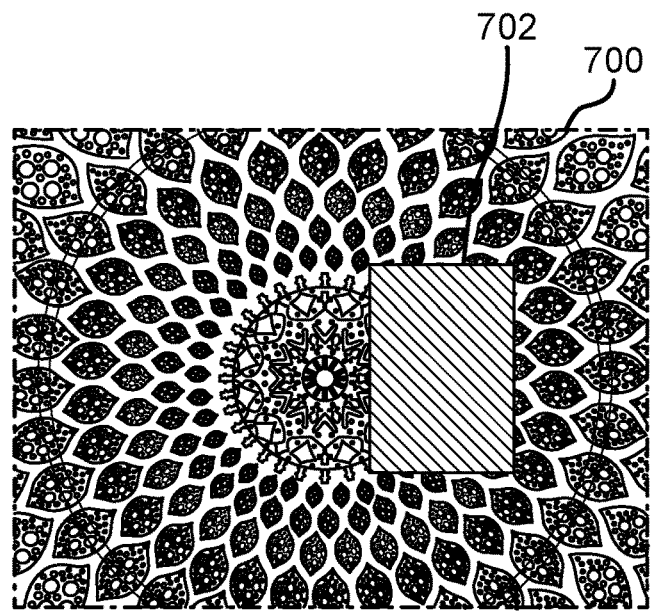
FIG. 7 shows an example of image generation according to aspects of the present disclosure.
Figure 7:
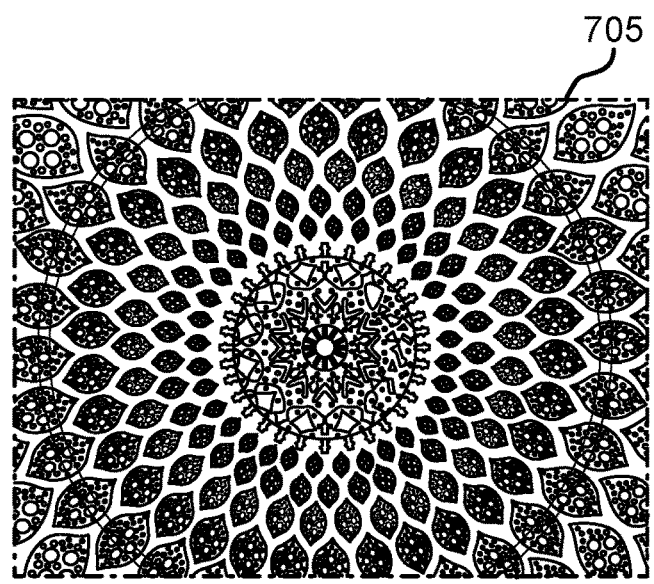

FIG. 7 shows an example of image generation according to embodiments of the present disclosure. The example shown includes image 700, masked region 702, and output image 705.

According to an embodiment of the present disclosure, image 700 includes a missing region or masked region 702. In some cases, the missing region of an image may be indicated by a mask (e.g., a binary mask). Image 700 is an example of, or includes aspects of, the corresponding element described with reference to FIGS. 3 and 13.

As an example shown in FIG. 7, image processing apparatus 200, as shown in FIG. 2, identifies a masked region of an image with missing content, and generates output image 705 with objects that match with the context of image 700. For example, output image 705 includes content that fills in masked region 702. Output image 705 is an example of, or includes aspects of, the corresponding element described with reference to FIGS. 5 and 13.

In some cases, image processing apparatus 200, as described in FIG. 2, includes a U-net structure of the denoising diffusion probabilistic model (DDPM). According to some embodiments, DDPM are a class of diffusion models which refer to a parameterized Markov chain that gradually adds noise to the input image in the opposite direction of sampling to obtain a noisy image in a forward process. In some cases, DDPM is trained using perceptual loss to gradually denoise data and estimate parameters of the generation process. In some cases, DDPM generates an output image based on the training using variational inference to produce samples matching an input image after a finite time. In some examples, the final output image depicts a semantically realistic region based on a masked or missing region of the input image.

According to some embodiments of the present disclosure, perceptual losses are used for training a diffusion model. Perception Prioritized (P2) weighting refers to a weighting scheme for the training objective that prioritizes learning from important noise levels. In some cases, minimal weights are assigned to the unnecessary stages. Accordingly, high weights are assigned to the remaining stages. Particularly, training is emphasized on the content stage to encourage the model to learn perceptually rich contexts.

According to an embodiment of the present disclosure, perceptual loss is used for training the diffusion model. In some examples, the perceptual loss includes a sample-based perceptual loss and an adaptively-blurred perceptual loss. In some cases, the input is a masked image and a diffusion model trained based on perceptual loss is used to predict an output image. In some examples, a pre-trained neural network that can extract features based on the input image is used for calculating the perceptual loss using $x_0$ (i.e., a ground-truth image) and $\hat{x}_0$ (i.e., a predicted image).

Accordingly, the pre-trained U-net architecture of the diffusion model takes image 700 including masked region 702 as input to predict the noise added at any timestep t. In some examples, the masked image is represented as $x_t$. In some cases, diffusion model 300, as described with reference to FIG. 3, takes a noisy image 700 as input and uses the pre-trained neural network to predict output image 705.

Figure 8:
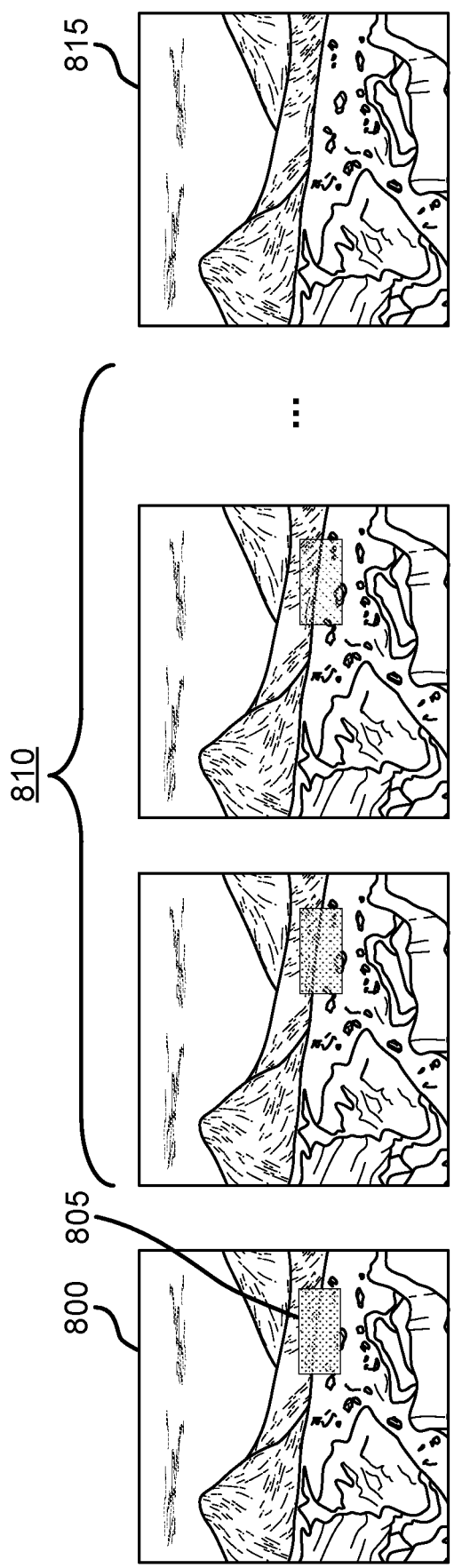
FIG. 8 shows an example of a set of visual results according to aspects of the present disclosure.

FIG. 8 shows an example of a set of visual results according to embodiments of the present disclosure. The example shown includes an image 800, masked region 805, intermediate images 810, and final output image 815. According to an embodiment, diffusion models are latent variable models that include latent variables of the same dimensionality as the input image. In some cases, the joint distribution of the model is referred to as a reverse process, and is defined as a Markov chain with learned Gaussian transitions. Accordingly, reverse diffusion process is fixed to a Markov chain that gradually removes Gaussian noise from a noisy image (e.g., image 800). In some examples, the reverse process variances can be learned by reparameterization or can be held constant as hyperparameters. For example, diffusion model predicts noise (Gaussian noise) from the input image.

As an example shown in FIG. 8, pixel diffusion model 300, as described with reference to FIG. 3, is trained to generate image 800, masked region 805, intermediate images 810, and final output image 815 at reverse diffusion. For example, pixel diffusion model 300 is a denoising diffusion probabilistic model (DDPM). During sampling, DDPM synthesizes final output image 815 (e.g., an inpainted image is synthesized) from image 800 using the learned denoising process. In some examples, sampling starts with noise $x_t$ in the masked region and produces gradually less-noisy samples $x_{t-1}$, $x_{t-2}$, . . . (a set of intermediate images 810) to reach final output image 815. Final output image 815 may be represented as $\hat{x}_0$.

According to an embodiment, diffusion model 300, as shown in FIG. 3, generates $x_{t-1}$ (i.e., a first image among intermediate images 810) that is a less noisy version of the noised image $x_t$ (i.e., image 800). A reverse process of a diffusion model starts with $x_t$ (noisy image) and iteratively denoises $x_t$ to generate a denoised image $x_0$. For example, diffusion model 300 begins with $x_{1000}$ and predicts a set of intermediate images 810 represented as $x_{999}$, $x_{998}$, . . . and so on till diffusion model 300 generates $x_0$ which is the estimated clean image. In some examples, the estimated clean image is the final output image 815. Accordingly, diffusion model 300 takes a noisy image $x_t$ as input and computes noise for the noisy image $x_t$ to obtain an estimated clean image $\hat{x}_0$ during inference.

Figure 9:
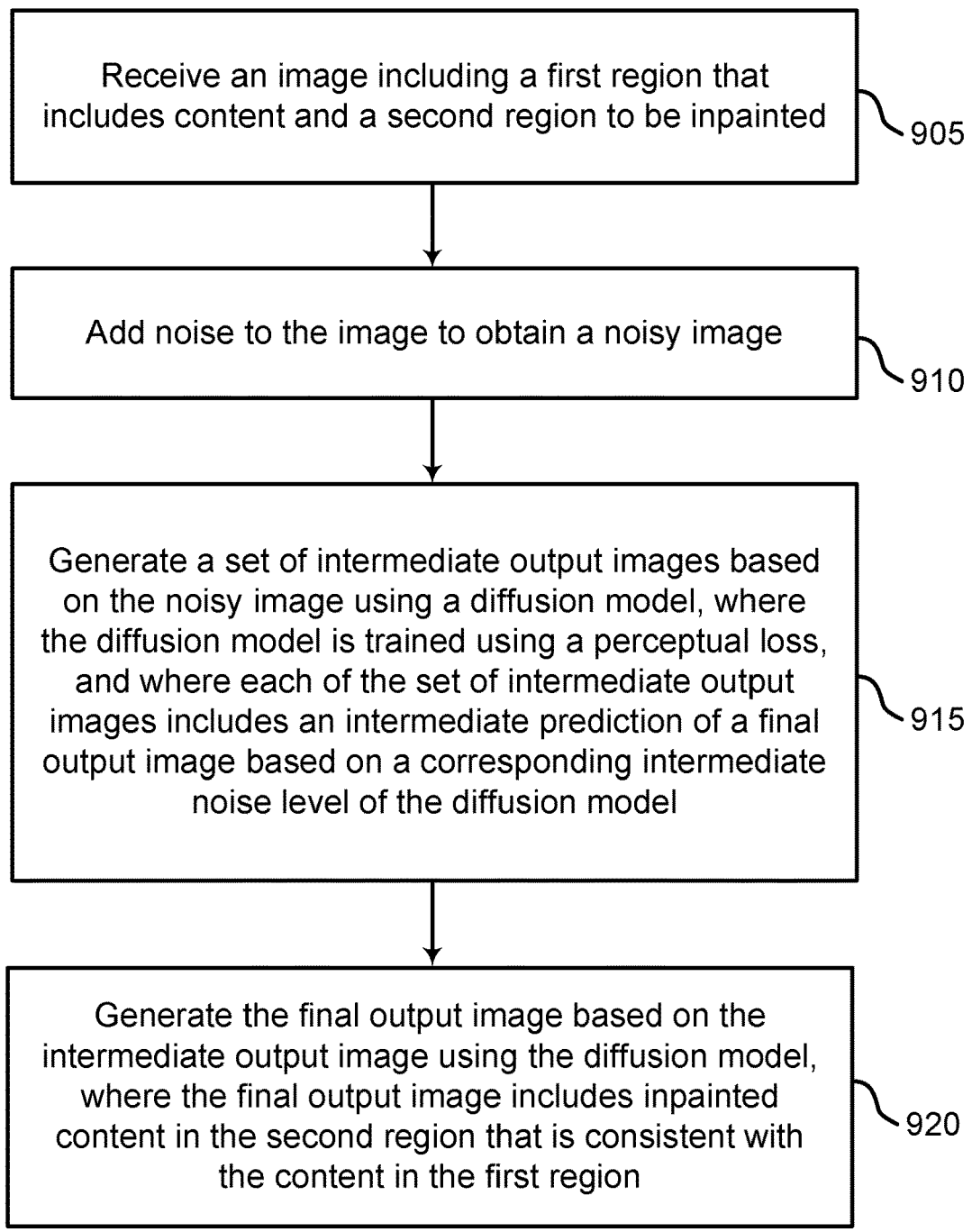
FIG. 9 shows an example of a method for generating an output image according to aspects of the present disclosure.

FIG. 9 shows an example of a method for generating an output image according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives an image including a first region that includes content and a second region to be inpainted. For example, such an image can be referred to as an input image. In some cases, the operations of this step refer to, or may be performed by, a user interface as described with reference to FIG. 2. In some examples, the image is a masked image having a masked region or a missing region to be filled in. User interface 220, as described with reference to FIG. 2, receives the masked image.

At operation 910, the system adds noise to the image to obtain a noisy image. In some cases, the operations of this step refer to, or may be performed by, a diffusion model as described with reference to FIG. 2. Diffusion model 300, as described with reference to FIG. 3, generates a noisy image by iteratively adding random noise to the masked image.

According to an embodiment, diffusion model 300 takes an input image in a pixel space and applies forward diffusion process 315, as described with reference to FIG. 3, to gradually add noise to the input image to obtain noisy images. In some cases, noisy images are obtained at various noise levels. For example, a DDPM (i.e., a diffusion model) starts with an input image $x_0$ and gradually adds noise to generate a noisy image $x_{1000}$. In some cases, the diffusion model can predict noise (e.g., Gaussian noise) from the input image.

At operation 915, the system generates a set of intermediate output images based on the noisy image using a diffusion model, where the diffusion model is trained using a perceptual loss, and where each of the set of intermediate output images includes an intermediate prediction of a final output image based on a corresponding intermediate noise level of the diffusion model. In some cases, the operations of this step refer to, or may be performed by, a diffusion model as described with reference to FIG. 2.

According to some embodiments, a denoising diffusion probabilistic model (DDPM) is configured to progressively degrade the image x for t time steps with Gaussian noise and then train a neural network to reverse the gradual noising process. During sampling, DDPM synthesizes data from pure noise using the learned denoising process. In some examples, sampling starts with noise $x_t$ and produces gradually less-noisy samples $x_{t-1}$, $x_{t-2}$, . . . to reach a final sample $x_0$.

For example, reverse diffusion process of pixel diffusion model 300, as described with reference to FIG. 3, can begin with $x_{1000}$ and predict intermediate output images $x_{999}$, $x_{998}$, . . . , $x_1$ to generate an estimated clean image $x_0$. In some examples, the diffusion model takes a noisy image as input and uses the neural network to predict an estimated clean image $x_0$. Further, noise is added back to the estimated clean image $x_0$ to avoid artifacts in the predicted image. In some cases, noise added at any timestep has a lower intensity than noise added at a previous timestep.

According to some embodiments of the present disclosure, a perceptual loss is used for training the diffusion model. In some examples, the perceptual loss includes an adaptively-blurred perceptual loss and/or a sample-based perceptual loss. In some cases, the perceptual loss is used to train diffusion model 300 to generate new data with features similar to features found in training data. For example, the perceptual loss includes prioritizing learning from important noise levels, i.e., minimal weights are assigned to the unnecessary noise levels and high weights are assigned to the remaining levels. Thus, training is emphasized on the content stage to encourage the model to learn perceptually rich context.

At operation 920, the system generates the final output image based on the intermediate output image using the diffusion model, where the final output image includes inpainted content in the second region that is consistent with the content in the first region. In some cases, the operations of this step refer to, or may be performed by, a diffusion model as described with reference to FIG. 2.

In some cases, noise is applied at a forward diffusion process and noise is removed at reverse diffusion process using a diffusion model (e.g., pixel diffusion model 300 shown in FIG. 3). Accordingly, pixel diffusion model 300 generates a final output image by inpainting the missing content of the input image. For example, the diffusion model identifies masked regions and guides the completion of complex scenes hidden in the mask to generate a final output image. The image processing apparatus provides the inpainted content in an output image based on the overall scene of the input image.

Training and Evaluation

In FIGS. 10-14, method, apparatus, and non-transitory computer readable medium for image processing are described. One or more embodiments of the method, apparatus, and non-transitory computer readable medium include receiving an image comprising content in a first region and in a second region; masking the second region to obtain a masked image; adding noise to the masked image to obtain a noisy image; generating a predicted output image based on the noisy image using a diffusion model; comparing the predicted output image to the image to obtain a perceptual loss; and training the diffusion model by updating parameters of the diffusion model based on the perceptual loss.

Some examples of the method, apparatus, and non-transitory computer readable medium further include computing a predicted noise based on the noisy image. Some examples further include computing a reconstruction loss based on the predicted noise and a ground truth noise, where the parameters of the diffusion model are updated based on the reconstruction loss.

Some examples of the method, apparatus, and non-transitory computer readable medium further include computing a weighted signal-to-noise-ratio loss, wherein the weighted signal-to-noise-ratio loss comprises the reconstruction loss. Some examples of the method, apparatus, and non-transitory computer readable medium further include computing a sample-based perceptual loss, wherein the perceptual loss comprises the sample-based perceptual loss.

Some examples of the method, apparatus, and non-transitory computer readable medium further include adding intermediate noise to the predicted output image to obtain a noisy output image. Some examples further include encoding the noisy output image to obtain image features. Some examples further include identifying an intermediate noisy image between the image and the noisy image. Some examples further include encoding the intermediate noisy image to obtain intermediate image features. Some examples further include comparing the image features and the intermediate image features to obtain the sample-based perceptual loss, wherein the parameters of the diffusion model are updated based on the sample-based perceptual loss.

Some examples of the method, apparatus, and non-transitory computer readable medium further include identifying a plurality of intermediate noisy images including the intermediate noisy image between the image and the noisy image, wherein the sample-based perceptual loss is computed based on the plurality of intermediate noisy images.

Some examples of the method, apparatus, and non-transitory computer readable medium further include selecting a plurality of samples of the predicted output image, wherein the sample-based perceptual loss is computed based on the plurality of samples of the predicted output image.

Some examples of the method, apparatus, and non-transitory computer readable medium further include computing an adaptively-blurred perceptual loss, wherein the perceptual loss comprises the adaptively-blurred perceptual loss. Some examples of the method, apparatus, and non-transitory computer readable medium further include identifying a filter of a predetermined kernel size, wherein the adaptively-blurred perceptual loss is computed based on the filter.

Some examples of the method, apparatus, and non-transitory computer readable medium further include identifying a first kernel at a first step. Some examples further include identifying a second kernel at a second step, wherein a size of the second kernel is different from a size of the first kernel, and wherein the adaptively-blurred perceptual loss is computed based on the first kernel and the second kernel.

Figure 10:
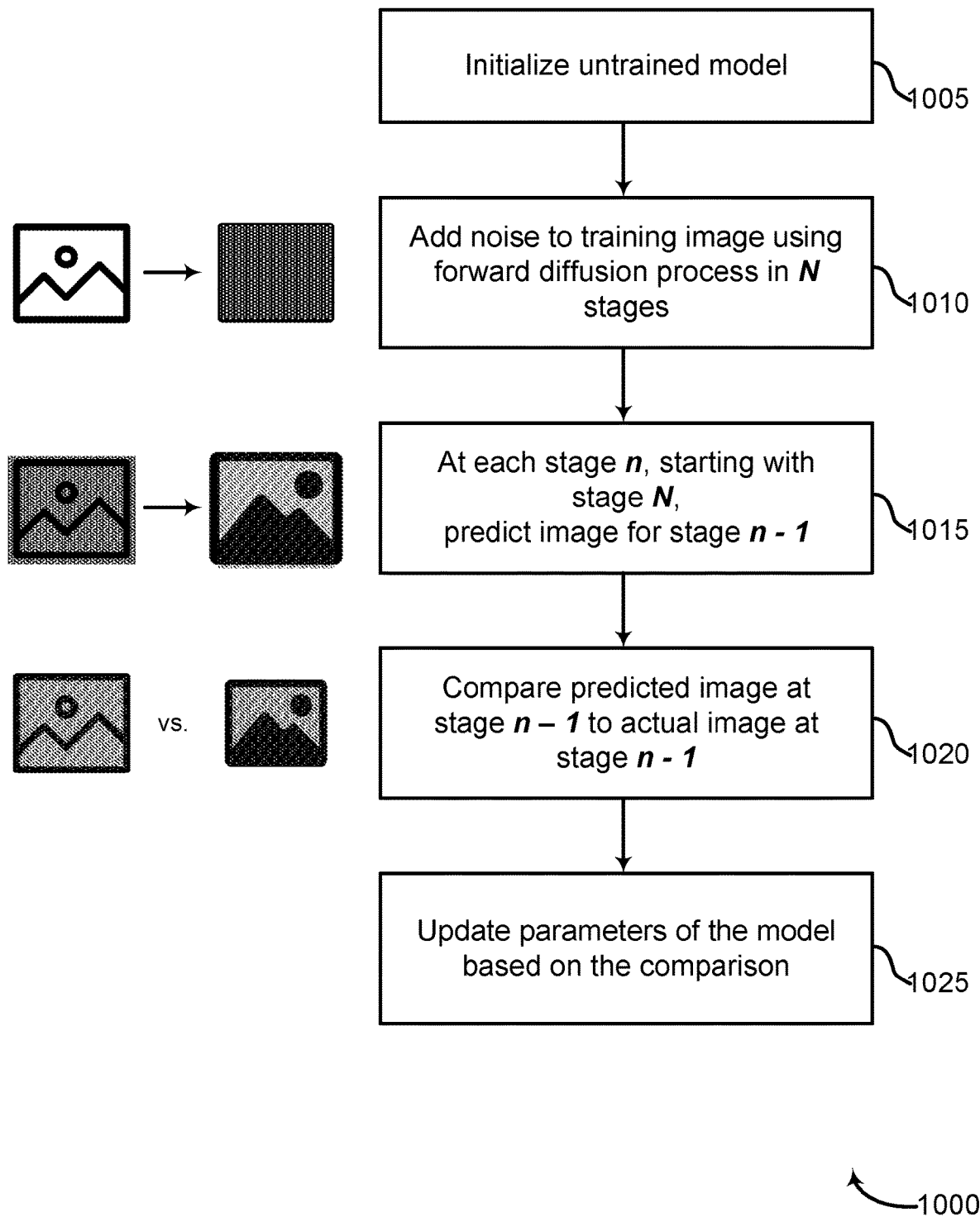
FIG. 10 shows an example of a method for training a diffusion model according to aspects of the present disclosure.

FIG. 10 shows an example of a method for training a diffusion model according to embodiments of the present disclosure. The method 1000 represents an example for training a reverse diffusion process as described above with reference to FIG. 5. In some examples, these operations are performed by a system including a processor executing a set of codes to control functional elements of an apparatus, such as the apparatus described in FIG. 4. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like. In some cases, the operations of this step refer to, or may be performed by, a training component as described with reference to FIG. 2.

At operation 1010, the system adds noise to a training image using a forward diffusion process in N stages. In some cases, the forward diffusion process is a fixed process where Gaussian noise is successively added to an image. In latent diffusion models, the Gaussian noise may be successively added to features in a latent space. In some cases, the operations of this step refer to, or may be performed by, a training component as described with reference to FIG. 2.

At operation 1015, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process. In some cases, the operations of this step refer to, or may be performed by, a diffusion model as described with reference to FIG. 2.

At operation 1020, the system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data. In some cases, the operations of this step refer to, or may be performed by, a training component as described with reference to FIG. 2.

At operation 1025, the system updates parameters of the model based on the comparison. For example, parameters of a U-Net may be updated using gradient descent. Time-dependent parameters of the Gaussian transitions can also be learned. In some cases, the operations of this step refer to, or may be performed by, a training component as described with reference to FIG. 2.

Figure 11:
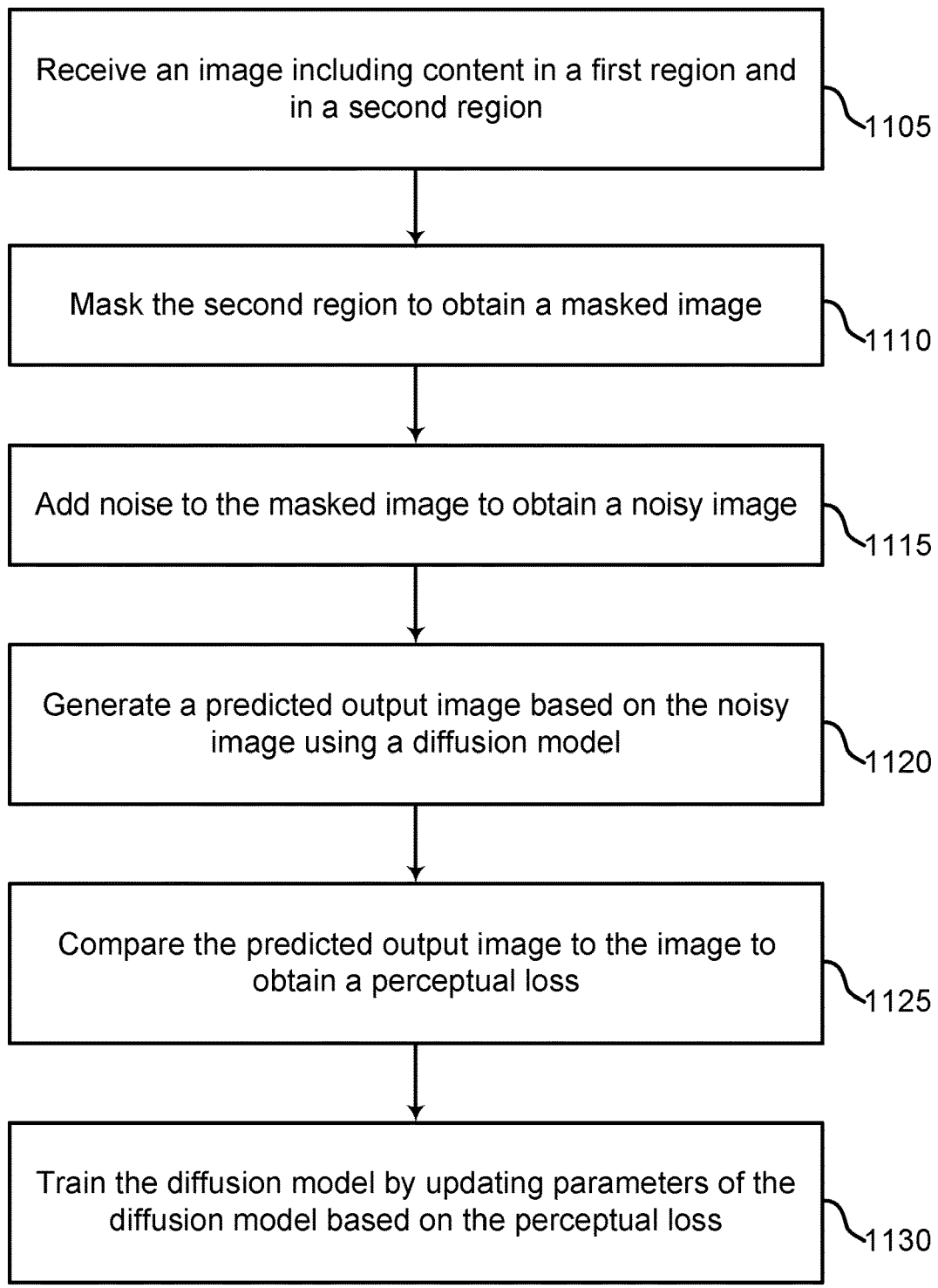
FIG. 11 shows an example of a method for training a diffusion model based on a perceptual loss according to aspects of the present disclosure.

FIG. 11 shows an example of a method for training a diffusion model based on a perceptual loss according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system receives an image including content in a first region and in a second region. In some cases, the operations of this step refer to, or may be performed by, a user interface as described with reference to FIG. 2. In some examples, image $x_0$ is referred to as a ground-truth image that is used to train a diffusion model.

At operation 1110, the system masks the second region to obtain a masked image. In some cases, the operations of this step refer to, or may be performed by, a diffusion model as described with reference to FIG. 2. According to an embodiment, the image is partially masked to obtain a masked image. For example, a binary mask indicates a missing region of image $x_0$.

According to an embodiment of the present disclosure, diffusion model 300, as described with reference to FIG. 3, masks a portion of the ground-truth image for training. Thus, the diffusion model may generate a masked image that includes a masked region or a missing region based on the ground-truth image $x_0$.

At operation 1115, the system adds noise to the masked image to obtain a noisy image. In some cases, the operations of this step refer to, or may be performed by, a diffusion model as described with reference to FIG. 2. Diffusion model 300 iteratively adds noise to the data during forward diffusion. In some examples, during training, the diffusion model takes an image in a pixel space as input and applies forward diffusion 315 to the ground-truth image $x_0$.

According to an embodiment, forward diffusion process gradually adds noise to the masked image to obtain noisy images $x_t$. Noisy images are obtained at various noise levels. For example, a diffusion model begins with a masked image and iteratively adds noise to generate a noisy image $x_{1000}$. In some cases, diffusion model can predict noise (e.g., Gaussian noise) from the input image.

At operation 1120, the system generates a predicted output image based on the noisy image using a diffusion model. In some cases, the operations of this step refer to, or may be performed by, a diffusion model as described with reference to FIG. 2. According to an embodiment, the diffusion model, via reverse diffusion process 325, as described with reference to FIG. 3, gradually removes noise from the noisy images at the various noise levels to obtain a predicted output image $\hat{x}_0$.

According to an embodiment, a reverse diffusion process is based on a U-Net. For example, U-Net 400, as shown in FIG. 4, includes a neural network architecture and takes a masked image and processes the image to generate a predicted output image. In some cases, a predicted output image is generated corresponding to each of the various noise levels.

At operation 1125, the system compares the predicted output image to the image to obtain a perceptual loss. In some cases, the operations of this step refer to, or may be performed by, a training component as described with reference to FIG. 2. Training component computes an L1 loss which is the training objective of the U-net model. In some cases, L1 loss refers to the difference between ground-truth noise and predicted noise. In some implementations, L1 loss is formulated as follows:

$$\text{loss\_eps} = \|\text{unet}(x_t, t) - \epsilon\|_1 \quad (1)$$

$$x_t(x_0, \epsilon) = \sqrt{\bar{\alpha}_t} x_0 + \sqrt{1 - \bar{\alpha}_t} \epsilon \quad (2)$$

The training component applies a signal-to-noise-ratio (SNR) loss to increase the performance of the x0-reparameterization. The training component computes an L1 loss based on the clean image $x_0$ as follows:

$$\text{loss\_x0} = \|\hat{x}_0 - x_0\|_1 \quad (3)$$

Next, the training component computes a loss on the noise $\epsilon$. $x_t$ is a linear combination of $x_0$ and $\epsilon$. Thus, given $x_t$ and $\hat{x}_0$, the predicted noise is calculated as $$\hat{\epsilon} = \frac{1}{\sqrt{1-\alpha_t}}(x_t - \sqrt{\alpha_t} x_0).$$

In some implementations, the predicted noise $\hat{\epsilon}$ is used to compute the loss on noise as follows:

$$\text{loss\_eps} = \|\hat{\epsilon} - \epsilon\|_1 \quad (4)$$

In some examples, the x0 and epsilon reconstruction losses are weighted to generate a signal-to-noise-ratio weighting loss. The signal-to-noise-ratio weighting loss includes a large noise in initial stage and low losses in the final stages. The training component attenuates loss_eps and loss_x0 based on the signal-to-noise-ratio to compute the signal-to-noise-ratio loss. In some cases, x t is a linear combination of $x_0$ and $\epsilon$. In cases when noise is a major component of $x_t$, the training component assigns more weight to loss_eps. When noise is not a major component of $x_t$, the training component assigns more weight to loss_x0. In some implementations, the loss associated with the signal to noise ratio is formulated as follows:

$$\text{loss\_SNR} = \alpha_t * \text{loss\_x0} + (1-\alpha_t) * \text{loss\_eps} \quad (5)$$

According to an embodiment, the perceptual loss is used to train the diffusion model. In some implementations, the perceptual loss is formulated as the following:

$$\mathcal{L}_{perc} = \|\phi(\hat{x}_0) - \phi(x_0)\|_2^2 \quad (6)$$

where $\phi$ is a feature of the input image. In some examples, the $\phi$ represents a pre-trained neural network that can extract features based on the image. $x_0$ is the ground truth clean image and $\hat{x}_0$ is the predicted image.

At operation 1130, the system trains the diffusion model by updating parameters of the diffusion model based on the perceptual loss. In some cases, the operations of this step refer to, or may be performed by, a training component as described with reference to FIG. 2. For example, the trained diffusion model generates a final output image that depicts an inpainted region with complete objects to match the scene from the input image.

According to an embodiment, training component 215, as described with reference to FIG. 2, updates parameters of the diffusion model based on the comparison between the predicted output image and the ground-truth image. For example, parameters of a U-Net are updated via gradient descent. Training component trains the diffusion model to generate new data with features similar to features in training data.

Figure 12:
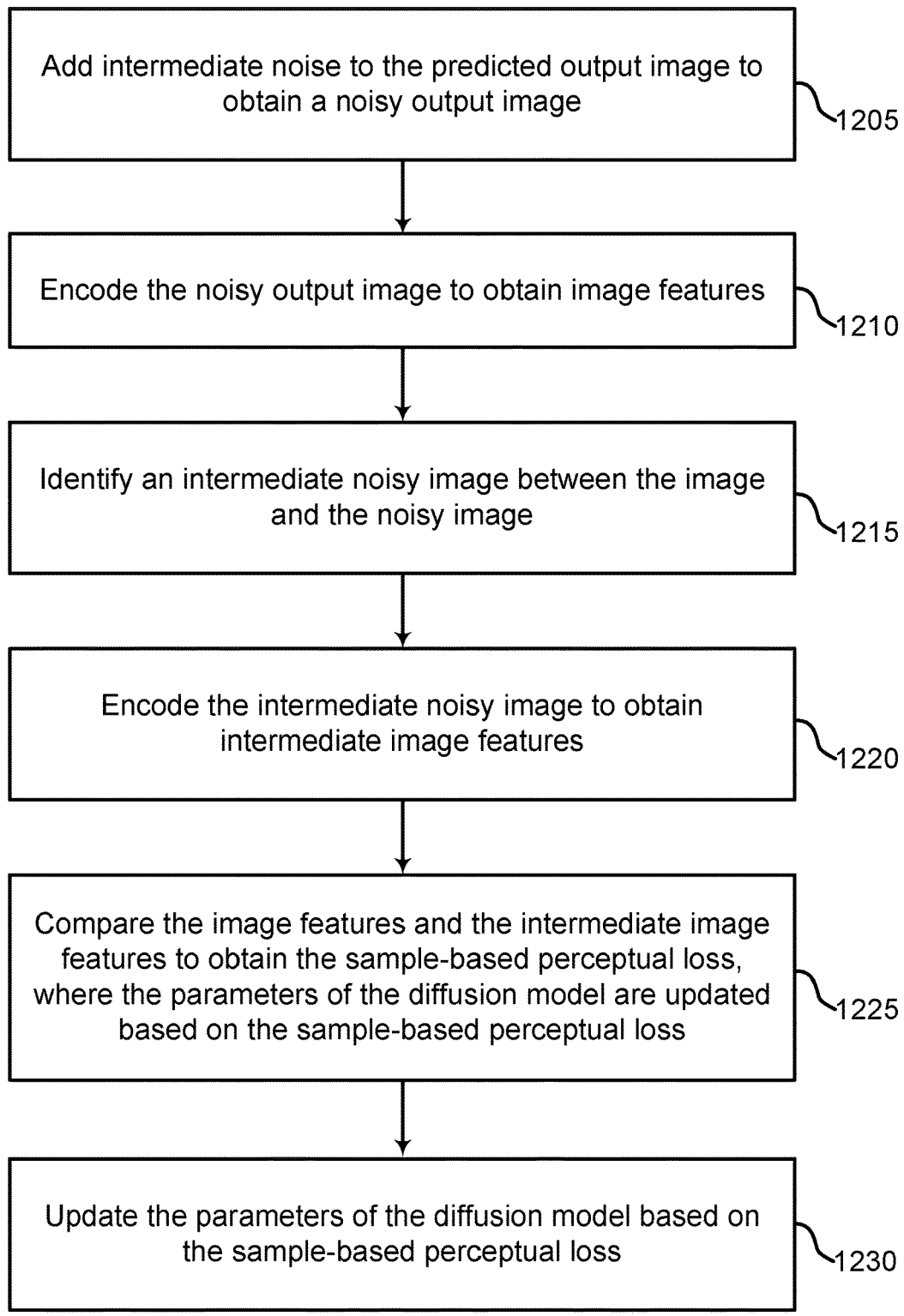
FIG. 12 shows an example of a method for computing a sample-based perceptual loss according to aspects of the present disclosure.

FIG. 12 shows an example of a method for computing a sample-based perceptual loss according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system adds intermediate noise to the predicted output image to obtain a noisy output image. In some cases, the operations of this step refer to, or may be performed by, a diffusion model as described with reference to FIGS. 2 and 3. According to an embodiment, the diffusion model starts with $x_0$ (i.e., ground truth image) and gradually adds noise to generate a noisy image $x_t$.

Diffusion model 300 performs a reverse diffusion process for denoising the noisy image $x_t$ to obtain a denoised image. In some cases, the denoised image can be represented as $x_0(x_t, t)$. Noise is again added to the denoised image to obtain noisy output image that is represented as $p(x_{t-1}|x_t)$. Here, $p(x_{t-1}|x_t)$ represents predicted distribution. During reverse diffusion, diffusion model 300 begins with noisy data, such as a noisy image $x_t$ and denoises the data to obtain the $p(x_{t-1}|x_t)$. At each step t−1, the reverse diffusion process takes $x_t$, such as first intermediate image, and t as input. Here, t represents a time step in the sequence of denoising steps associated with different noise levels, The reverse diffusion process outputs $x_{t-1}$, such as second intermediate image iteratively until $x_t$ is reverted back to $x_0$, the original image. The reverse process can be represented as:

$$p_\theta(x_{t-1}|x_t) := N(x_{t-1}; \mu_\theta(x_t,t), \Sigma_\theta(x_t,t)) \qquad (7)$$

At operation 1210, the system encodes the noisy output image to obtain image features. In some cases, the operations of this step refer to, or may be performed by, a diffusion model as described with reference to FIG. 2. According to some embodiments, the diffusion model encodes an image in a pixel space to obtain image features in a latent space. For example, the noisy output image $x_t$ is encoded to obtain $\phi$ as features of the image. In some examples, a pre-trained neural network can extract features $\phi$ based on the image.

At operation 1215, the system identifies an intermediate noisy image between the image and the noisy image. In some cases, the operations of this step refer to, or may be performed by, a diffusion model as described with reference to FIG. 2. In some examples, noise $\epsilon$ is added to the ground truth clean image $x_0$. In some examples, intermediate noisy images $x_1, x_2, x_3, \ldots, x_{t-1}$ are generated based on a forward diffusion process, i.e., noise is added to a clean ground-truth image.

In some cases, a diffusion model includes a forward diffusion process for adding noise to an image (or features in a latent space) to generate a noisy image $x_t$. The forward diffusion process 405 can be represented as $q(x_t|x_{t-1})$. In some cases, the forward diffusion process 405 is used during training to generate images with successively greater noise. In an example of forward process for a diffusion model, the model maps an observed variable $x_0$ (either in a pixel space or a latent space) intermediate variables $x_t$ using a Markov chain. The Markov chain gradually adds Gaussian noise to the data to obtain the approximate posterior $q(x_{1:t}|x_0)$ as the latent variables are passed through a neural network such as a U-Net, where $x_1, \ldots, x_t$ have the same dimensionality as $x_0$.

At operation 1220, the system encodes the intermediate noisy image to obtain intermediate image features. In some cases, the operations of this step refer to, or may be performed by, a diffusion model as described with reference to FIG. 2. According to some embodiments, the diffusion model encodes an image in a pixel space to obtain image features in a latent space. In some examples, the intermediate noisy images are encoded to obtain intermediate image features represented as $\phi(x_{t-1}^{(k)})$. In some examples, a pre-trained neural network can extract intermediate image features $\phi(x_{t-1}^{(k)})$ based on the image. According to an embodiment, diffusion model 300, as described with reference to FIG. 3, takes a ground-truth image $x_0$ as input and gradually adds noise to the ground-truth image to generate intermediate noisy images.

At operation 1225, the system compares the image features and the intermediate image features to obtain the sample-based perceptual loss. In some cases, the operations of this step refer to, or may be performed by, a training component as described with reference to FIG. 2. In some examples, sample-based perceptual loss includes a noisy image as the input and predicts an estimated clean image.

In some examples, the diffusion model takes a noisy image as input and predicts an estimated clean image $x_0$. The diffusion model adds the noise back to the predicted clean image $x_0$. In some examples, the training component samples Gaussian noise and adds the sampled noise back to the predicted image to obtain a set of K sampled noisy images. The training component generates features corresponding to the set of K sampled noisy images and averages these features, i.e., represented as $$\frac{1}{K} \sum_{x_{t-1}^{p(k)}} \phi(x_{t-1}^{p(k)}).$$

In some examples, the training component takes a ground-truth image corresponding to the noisy image and generates a set of K intermediate noisy images based on the ground-truth image. The training component generates features corresponding to the set of K intermediate noisy images and averages these features. In some cases, the average of the features is represented as $$\frac{1}{K} \sum_{x_{t-1}^{(k)}} \phi(x_{t-1}^{(k)}).$$

At operation 1230, the system updates the parameters of the diffusion model based on the sample-based perceptual loss. In some cases, the operations of this step refer to, or may be performed by, a training component as described with reference to FIG. 2.

In some cases, the diffusion model is trained to maximize evidence lower bound (ELBO) which can be defined as matching the denoising distribution $q(x_{t-1}|x_t)$ with the parameterized denoising model $p_\theta(x_{t-1}|x_t)$. In some implementations, the evidence lower bound is formulated as follows:

$$\mathcal{L} = -\sum_{t\geq 1} \mathbb{E}_{q(x_t)}[D_{KL}(q(x_{t-1}|x_t)\|p_\theta(x_{t-1}|x_t))] + C \qquad (8)$$

where q( ) refers to the ground-truth denoising distribution, p( ) refers to the predicted distribution, C contains constant terms that are independent of θ, and $D_{KL}$ denotes the Kullback-Leibler (KL) divergence.

According to an embodiment, the training component generates features based on intermediate noisy images and noisy output images. The training component computes an average of the features. For example, average of the features is computed on the noisy output images and intermediate noisy images generated from a predicted image and ground-truth image to obtain a moment matching loss $\hat{\mathcal{L}}_{MMD}$.

Figure 13:
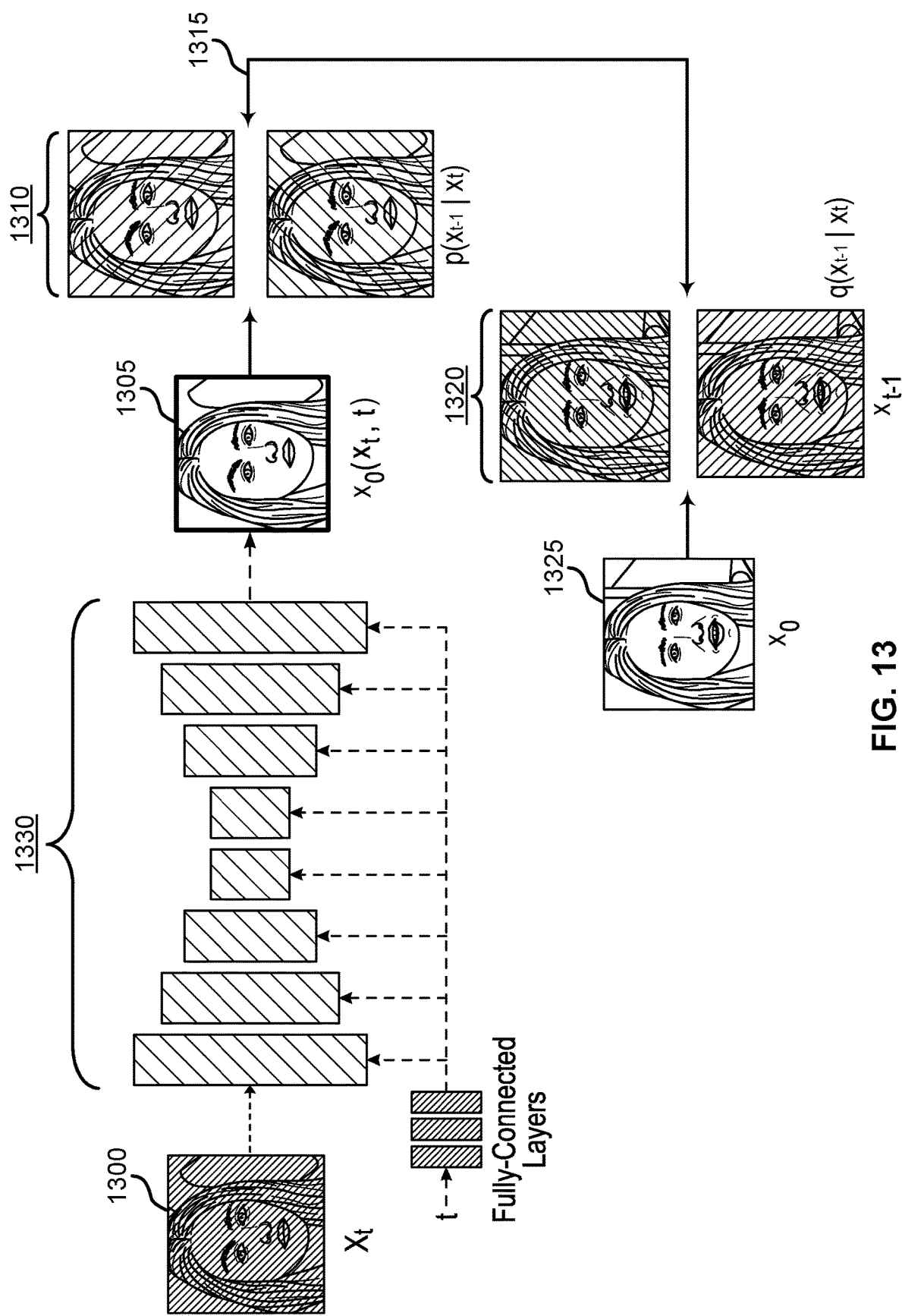
FIG. 13 shows an example of computing a sample-based perceptual loss according to aspects of the present disclosure.

FIG. 13 shows an example of a sample-based perceptual loss 1315 according to embodiments of the present disclosure. The example shown includes noisy image 1300, output image 1305, noisy output image 1310, perceptual loss 1315, intermediate noisy image 1320, image 1325, and reverse diffusion process 1330.

A diffusion model works by iteratively adding noise to the data during a forward process. During training, the diffusion model takes an original image in a pixel space as input and applies forward diffusion process to gradually add noise to the original image to obtain noisy image 1300. Noisy image 1300 is an example of, or includes aspects of, the corresponding element described with reference to FIGS. 3 and 5.

According to an embodiment of the present disclosure, the diffusion model is trained to generate output image 1305 via reverse diffusion process 1330. At reverse diffusion process 1330, the diffusion model begins with noisy image 1300 and denoises the image to obtain output image 1305. At each step t–1, reverse diffusion process 1330 takes noisy image 1300 and t as input. Here, t represents a step in the sequence of transitions associated with different noise levels. Reverse diffusion process 1330 is an example of, or includes aspects of, the corresponding element described with reference to FIG. 3.

Reverse diffusion process 1330 (e.g., a U-Net ANN) includes removing the noise from noisy image 1300 gradually at the various noise levels to obtain output image 1305. For example, output image 1305 refers to an image generated at a timestep t by reverse diffusion process 1330. Thus, output image 1305 can be predicted for any timestep t. In some cases, diffusion model 300, as described in FIG. 3, adds noise to output image 1305 to generate noisy output image 1310.

The diffusion model, via reverse diffusion process 1330, predicts noisy output images 1310 directly bypassing output image 1305. In some examples, noisy output image 1310 is represented as $p(x_{t-1}|x_t)$. In some cases, K samples of noisy output image 1310 are predicted. As an example shown in FIG. 13, K is set equal to 2 and accordingly two noisy output images 1310 are shown. In some examples, K can be set to other values. Output image 1305 is an example of, or includes aspects of, the corresponding element described with reference to FIGS. 5 and 7. Noisy output image 1310 is an example of, or includes aspects of, the corresponding element described with reference to FIG. 12.

Image 1325 is a ground-truth image for training the diffusion model. Image 1325 is an example of, or includes aspects of, the corresponding element described with reference to FIGS. 3 and 7. In some examples, the diffusion model takes image 1325 in a pixel space as input and gradually adds noise to image 1325 via a forward diffusion process. In some cases, the diffusion model generates a set of intermediate noisy images at various noise levels based on image 1325 (i.e., a ground-truth image).

Intermediate noisy image 1320 can be generated from image 1325 at a timestep t. In some examples, intermediate noisy image 1320 is represented as $q(x_{t-1}|x_t)$. In some cases, K samples of intermediate noisy image 1320 are predicted. In this example, K is equal to 2 and two intermediate noisy images 1320 are shown. According to an embodiment, equal amount of noise may be added to output image 1305 and image 1325 to generate noisy output image 1310 and intermediate noisy image 1320, respectively. Intermediate noisy image 1320 is an example of, or includes aspects of, the corresponding element described with reference to FIG. 12.

In some cases, diffusion model 225 as shown in FIG. 2 includes an encoder to generate image features. For example, an encoder can encode noisy output image 1310 to generate image features. Similarly, the encoder can encode intermediate noisy image 1320 to generate intermediate image features. In some cases, the features can be computed on K samples of noisy output image 1310 and intermediate noisy image 1320. Further, diffusion model 300 computes an average of the features.

In some cases, perceptual loss 1315 can be computed based on the image features and the intermediate image features thus generated. For example, perceptual loss 1315 can be a sample-based perceptual loss. According to an embodiment, the training component computes the average of the features corresponding to noisy output image 1310 and intermediate noisy image 1320 to obtain a moment matching loss $\hat{\mathcal{L}}_{MMD}$.

$$\hat{\mathcal{L}}_{MMD} = \left\| \frac{1}{K} \sum_{x_{t-1}^{(k)}} \phi(x_{t-1}^{(k)}) - \frac{1}{K} \sum_{x_{t-1}^{p(k)}} \phi(x_{t-1}^{p(k)}) \right\|^2 \qquad (9)$$

where K refers to the number of samples of noisy output image and intermediate noisy image, $\phi$ represents a feature of the noisy output image and intermediate noisy image.

Figure 14:
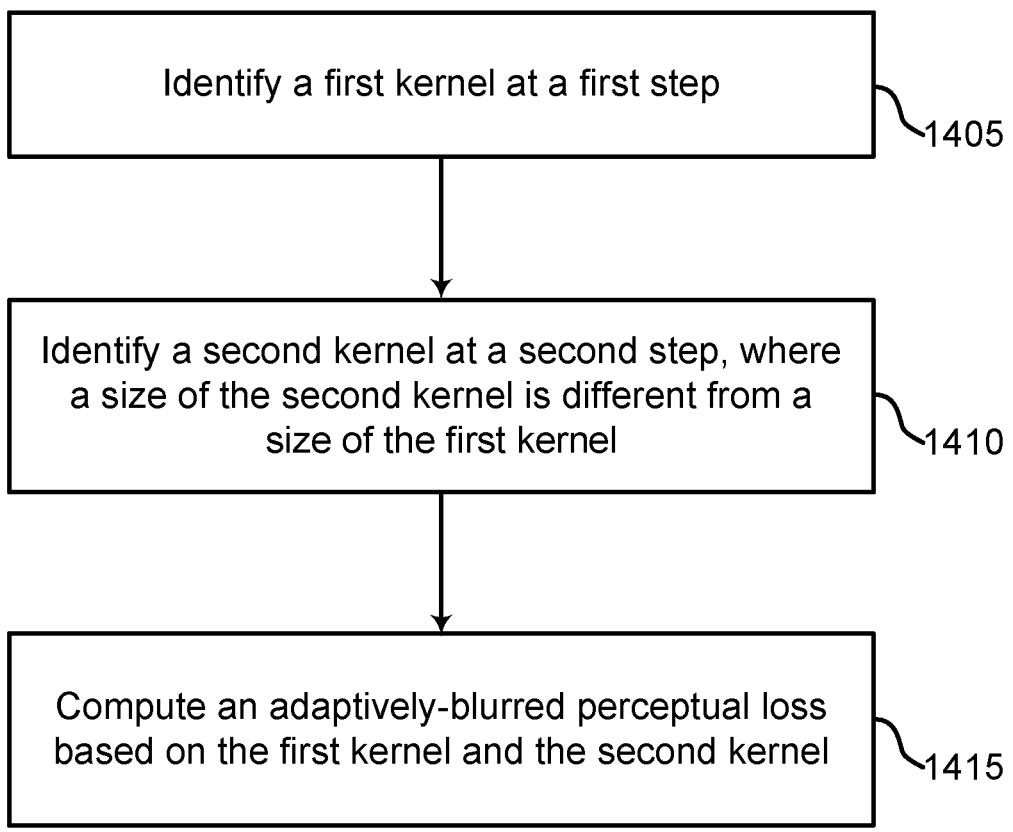
FIG. 14 shows an example of a method for computing an adaptively-blurred perceptual loss according to aspects of the present disclosure.

FIG. 14 shows an example of a method for computing an adaptively-blurred perceptual loss according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure include an adaptively-blurred perceptual loss for model training. In an embodiment, $K_t$ is used to represent a Gaussian kernel. In some cases, a Gaussian kernel increases radius with timesteps. For example, a Gaussian kernel can have a first radius $r_1$ at a timestep $t_1$ and a second radius $r_2$ at a timestep $t_2$ such that $r_1 \neq r_2$. Accordingly, size of Gaussian kernel may be different at different timesteps. For example, small values of t indicate a small Gaussian kernel and thus less blurring of the image. In some examples, Gaussian blurring is applied on an output image before computing the perceptual loss.

At operation 1405, the system identifies a first kernel at a first step. In some cases, the operations of this step refer to, or may be performed by, a training component as described with reference to FIG. 2.

At operation 1410, the system identifies a second kernel at a second step, where a size of the second kernel is different from a size of the first kernel. In some cases, the operations of this step refer to, or may be performed by, a training component as described with reference to FIG. 2.

At operation 1415, the system computes an adaptively-blurred perceptual loss based on the first kernel and the second kernel. In some cases, the operations of this step refer to, or may be performed by, a training component as described with reference to FIG. 2.

According to an embodiment of the present disclosure, the adaptively-blurred perceptual loss focuses on low frequency content at initial steps. For example, the low frequency content indicates background information, color, and global shape of the image. Alternatively, high frequency content, such as texture and detailed structures, can be obtained by applying a Gaussian kernel to the low frequency components of the image. In some cases, the image may be represented as $x_0$. In some examples, the image can be a ground-truth image, as described with reference to FIG. 13. In some examples, predicted output image 705, as described with reference to FIG. 7, can be represented as $\hat{x}_0$.

In some implementations, an adaptively-blurred perceptual loss may be implemented as follows:

$$\mathcal{L}_{perc}=\|\phi(\hat{x}_0*K_t)-\phi(x_0*K_t)\|_0^2 \tag{10}$$

where $K_t$ refers to a Gaussian kernel, * indicates a convolution operation, and t refers to the time step. For example, small values of t indicate a small Gaussian kernel and less blurring of the image. The adaptively-blurred perceptual loss may be an L1 loss or L2 loss.

Figure 15:
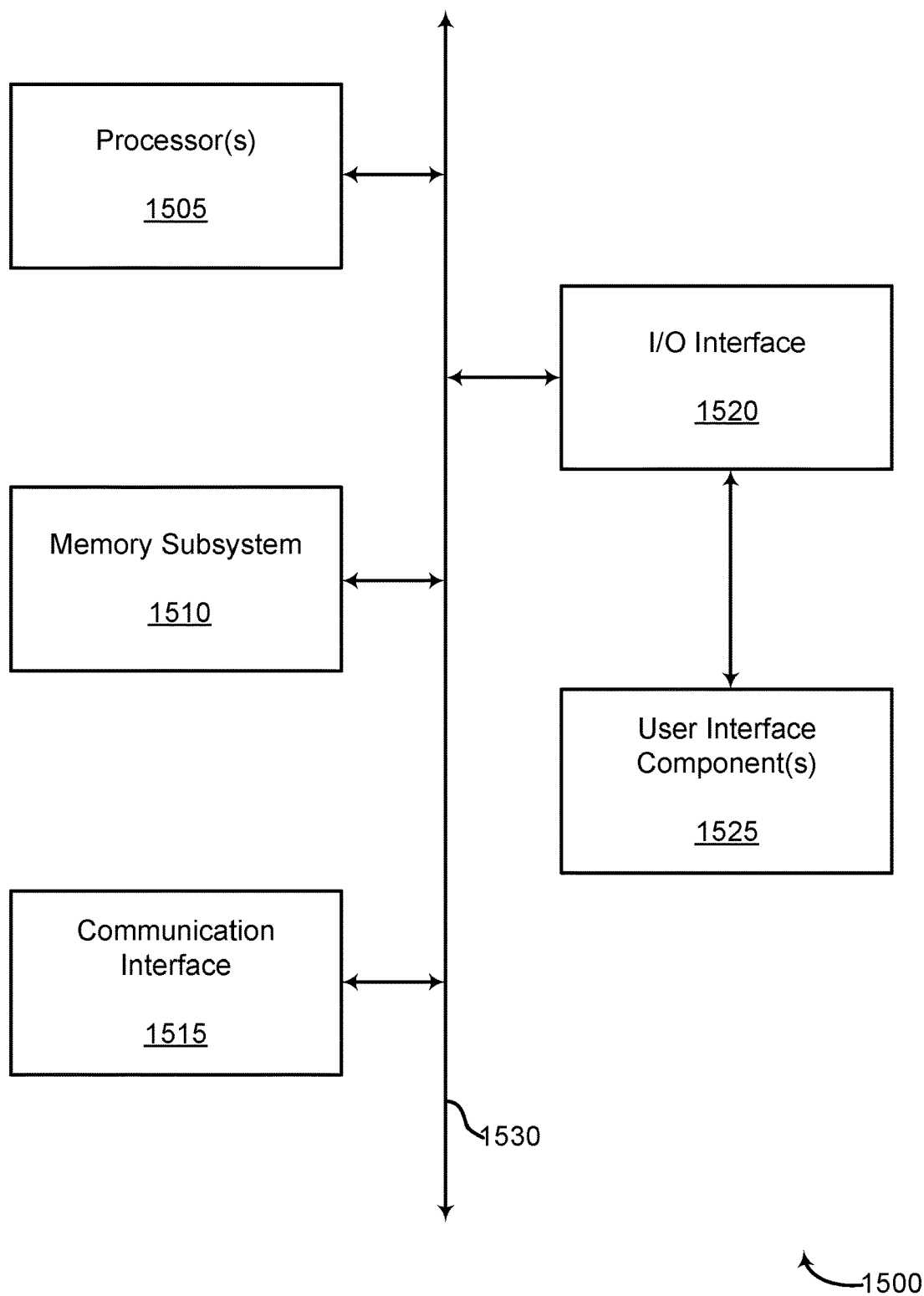
FIG. 15 shows an example of a computing device according to aspects of the present disclosure.

FIG. 15 shows an example of a computing device 1500 according to embodiments of the present disclosure. The example shown includes computing device 1500, processor 1505, memory subsystem 1510, communication interface 1515, I/O interface 1520, user interface component 1525, and channel 1530.

In some embodiments, computing device 1500 is an example of, or includes aspects of, image processing apparatus 200 of FIG. 2. In some embodiments, computing device 1500 includes one or more processors 1505 that can execute instructions stored in memory subsystem 1510 for identifying a region of an image containing text; identifying a color of the text; and generating a modified image using a diffusion model based on the color of the text, wherein the modified image has a background color in the region of the image that contrasts with the color of the text.

According to some aspects, computing device 1500 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1520 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote-control device interfaced with a user interface directly or through the I/O controller), or a combination thereof. In some cases, user interface component(s) 1525 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving an image comprising a first region that includes content and a second region to be inpainted;
adding noise to the image to obtain a noisy image;
generating a plurality of intermediate output images based on the noisy image using a diffusion model, wherein the diffusion model is trained using a perceptual loss based on a difference between perceptual features extracted from a predicted image and perceptual features extracted from a clean image, and wherein each of the plurality of intermediate output images comprises an intermediate prediction of a final output image based on a corresponding intermediate noise level of the diffusion model; and
generating the final output image based on the plurality of intermediate output images using the diffusion model, wherein the final output image includes inpainted content in the second region that is consistent with the content in the first region.

2. The method of claim 1, further comprising:
providing the image as an input to the diffusion model, wherein the intermediate output image is conditioned based on the first region of the image.

3. The method of claim 1, further comprising:
encoding the noisy image to obtain image features; and
decoding the image features to obtain the intermediate output image.

4. The method of claim 1, further comprising:
receiving a user input indicating the second region to be inpainted.

5. A method comprising:
initializing a diffusion model;
receiving training data including an image comprising content in a first region and in a second region;
masking the second region to obtain a masked image;
adding noise to the masked image to obtain a noisy image;
identifying a first kernel at a first step;
identifying a second kernel at a second step, wherein a size of the second kernel is different from a size of the first kernel;
computing an adaptively-blurred perceptual loss based on the first kernel and the second kernel; and
training the diffusion model to inpaint the second region based on the noisy image using a perceptual loss, wherein the perceptual loss comprises the adaptively-blurred perceptual loss.

6. The method of claim 5, further comprising:
computing a predicted noise based on the noisy image; and
computing a reconstruction loss based on the predicted noise and a ground truth noise, wherein the diffusion model is trained based on the reconstruction loss.

7. The method of claim 5, further comprising:
computing a weighted signal-to-noise-ratio loss, wherein the diffusion model is trained based on the weighted signal-to-noise-ratio loss.

8. The method of claim 5, further comprising:
generating a predicted output image based on the noisy image using the diffusion model; and
comparing the predicted output image to the image to obtain the perceptual loss.

9. The method of claim 5, further comprising:
adding intermediate noise to a predicted output image to obtain a noisy output image;
encoding the noisy output image to obtain image features;
identifying an intermediate noisy image between the image and the noisy image;
encoding the intermediate noisy image to obtain intermediate image features; and
comparing the image features and the intermediate image features to obtain a sample-based perceptual loss, wherein the diffusion model is trained based on the sample-based perceptual loss.

10. The method of claim 9, further comprising:
identifying a plurality of intermediate noisy images including the intermediate noisy image between the image and the noisy image, wherein the sample-based perceptual loss is computed based on the plurality of intermediate noisy images.

11. The method of claim 9, further comprising:
selecting a plurality of samples of the predicted output image, wherein the sample-based perceptual loss is computed based on the plurality of samples of the predicted output image.

12. The method of claim 5, further comprising:
identifying a filter of a predetermined kernel size, wherein the adaptively-blurred perceptual loss is computed based on the filter.

13. An apparatus comprising:
a processor; and
a memory including instructions executable by the processor to:
receive an image comprising a first region that includes content and a second region to be inpainted;
add noise to the image to obtain a noisy image;
generate a plurality of intermediate output images based on the noisy image using a diffusion model, wherein the diffusion model is trained using a perceptual loss based on a difference between perceptual features extracted from a predicted image and perceptual features extracted from a clean image, and wherein each of the plurality of intermediate output images comprises an intermediate prediction of a final output image based on a corresponding intermediate noise level of the diffusion model; and
generate the final output image based on the plurality of intermediate output images using the diffusion model, wherein the final output image includes inpainted content in the second region that is consistent with the content in the first region.

14. The apparatus of claim 13, wherein:
the diffusion model comprises a U-Net architecture.

15. The apparatus of claim 13, wherein:
the diffusion model comprises a denoising diffusion probabilistic model (DDPM).

16. The apparatus of claim 13, wherein:
the perceptual loss comprises a sample-based perceptual loss.

17. The apparatus of claim 13, wherein:
the perceptual loss comprises an adaptively-blurred perceptual loss.

18. The apparatus of claim 13, further comprising:
a user interface configured to receive a user input indicating the second region to be inpainted.

* * * * *